US012218442B2

(12) United States Patent
Sone et al.

(10) Patent No.: US 12,218,442 B2
(45) Date of Patent: Feb. 4, 2025

(54) ANTENNA DEVICE FOR VEHICLE

(71) Applicant: YOKOWO CO., LTD., Tokyo (JP)

(72) Inventors: Takayuki Sone, Tomioka (JP); Satoshi Iwasaki, Tomioka (JP); Yuhei Saito, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 204 days.

(21) Appl. No.: 17/909,441

(22) PCT Filed: Mar. 11, 2021

(86) PCT No.: PCT/JP2021/009775
§ 371 (c)(1),
(2) Date: Sep. 6, 2022

(87) PCT Pub. No.: WO2021/193094
PCT Pub. Date: Sep. 30, 2021

(65) Prior Publication Data

US 2023/0155293 A1 May 18, 2023

(30) Foreign Application Priority Data

Mar. 25, 2020 (JP) ................................ 2020-053910

(51) Int. Cl.

| | |
|---|---|
| ***H01Q 9/04*** | (2006.01) |
| ***H01Q 1/32*** | (2006.01) |
| ***H01Q 1/38*** | (2006.01) |
| ***H01Q 1/48*** | (2006.01) |
| ***H01Q 5/378*** | (2015.01) |

(Continued)

(52) U.S. Cl.
CPC ......... *H01Q 9/0457* (2013.01); *H01Q 1/3275* (2013.01); *H01Q 1/48* (2013.01); *H01Q 9/0421* (2013.01); *H01Q 21/00* (2013.01)

(58) Field of Classification Search
CPC ........ H01Q 5/378; H01Q 9/0421; H01Q 1/38; H01Q 5/392; H01Q 9/26; H01Q 9/40; H01Q 9/42
See application file for complete search history.

(56) References Cited

U.S. PATENT DOCUMENTS

| | | | |
|---|---|---|---|
| 6,657,593 | B2 | 12/2003 | Nagumo et al. |
| 7,315,289 | B2 | 1/2008 | Puente Baliarda et al. |
| 8,994,604 | B2 | 3/2015 | Puente Baliarda et al. |

(Continued)

FOREIGN PATENT DOCUMENTS

| | | | |
|---|---|---|---|
| JP | 2003-8326 | A | 1/2003 |
| JP | 2003-133842 | A | 5/2003 |

(Continued)

OTHER PUBLICATIONS

WO2015107983Translation (Year: 2015); Author: Shibayama Takamitsu, Title: Antenna Device, pp. 1-8.*

(Continued)

*Primary Examiner* — Wei (Victor) Y Chan
(74) *Attorney, Agent, or Firm* — XSENSUS LLP

(57) ABSTRACT

An antenna device (10) for vehicle, includes a first antenna element (100) disposed on a ground (20), and a second antenna element (200) disposed on the ground (20), and at least a portion of the first antenna element (100) and at least a portion of the second antenna element (200) are capacitively coupled.

15 Claims, 24 Drawing Sheets

(51) Int. Cl.
*H01Q 5/392* (2015.01)
*H01Q 21/00* (2006.01)

(56) References Cited

U.S. PATENT DOCUMENTS

| | | | | |
|---|---|---|---|---|
| 10,056,699 | B2 * | 8/2018 | Elsallal .................... H01Q 1/48 | |
| 10,135,138 | B2 | 11/2018 | Puente Baliarda et al. | |
| 10,305,162 | B2 | 5/2019 | Ortigosa et al. | |
| 10,333,208 | B2 | 6/2019 | Ayatollahi et al. | |
| 10,468,770 | B2 | 11/2019 | Puente Baliarda et al. | |
| 10,734,723 | B2 | 8/2020 | Puente Baliarda et al. | |
| 2002/0196192 | A1 * | 12/2002 | Nagumo ................ H01Q 5/392 | 343/702 |
| 2005/0195124 | A1 * | 9/2005 | Puente Baliarda .. H01Q 9/0414 | 343/893 |
| 2008/0129630 | A1 | 6/2008 | Baliarda et al. | |
| 2015/0162666 | A1 | 6/2015 | Puente Baliarda et al. | |
| 2016/0172758 | A1 | 6/2016 | Puente Baliarda et al. | |
| 2017/0317409 | A1 | 11/2017 | Ayatollahi et al. | |
| 2019/0288393 | A1 | 9/2019 | Puente Baliarda et al. | |
| 2020/0099133 | A1 | 3/2020 | Puente Baliarda et al. | |
| 2020/0395666 | A1 | 12/2020 | Puente Baliarda et al. | |

FOREIGN PATENT DOCUMENTS

| | | | | |
|---|---|---|---|---|
| JP | 2005-538623 | A | 12/2005 | |
| KR | 20170003990 | U | 11/2017 | |
| WO | WO-2004025778 | A1 * | 3/2004 | ............... H01Q 1/36 |
| WO | WO-2015107983 | A1 * | 7/2015 | ............. H01Q 1/243 |
| WO | 2017/191811 | A1 | 11/2017 | |

OTHER PUBLICATIONS

International Search Report and Written Opinion mailed on May 25, 2021, received for PCT Application PCT/JP2021/009775, filed on Mar. 11, 2021, 8 pages including English Translation.
Notice of Reasons for Refusal mailed Jul. 9, 2024, in Japanese Application No. 2022-509906, 5 pages. (with translation).
The First Office Action mailed Nov. 19, 2024, in Chinese Application No. 202110263459.0, 13 pages including English translation.

* cited by examiner

ANTENNA DEVICE FOR VEHICLE

CROSS-REFERENCE TO RELATED APPLICATIONS

The present application is based on PCT filing PCT/JP2021/009775, filed Mar. 11, 2021, which claims priority to JP 2020-053910, filed Mar. 25, 2020, the entire contents of each are incorporated herein by reference.

TECHNICAL FIELD

The present invention relates to an antenna device for vehicle.

BACKGROUND ART

In recent years, there is an increasing demand for communication using a frequency band, such as Long Term Evolution (LTE), 4th Generation Mobile Communication System (4G), or 5th Generation Mobile Communication System (5G). There is also a demand for a small antenna stably usable with radiation efficiency over a broadband, such as a frequency band of 69 MHz to 6 GHz, 617 MHz to 5 GHz, or 5.9 GHz to 7.1 GHz.

Patent Document 1 describes an antenna having a polygonal conductor plate of which a lower side on a ground side is shorter than an upper side. The conductor plate includes a slit having an open end in the vicinity of a feeding point on a lower side of a conductor. In this antenna, a return loss equal to or less than −5 dB is obtained in a frequency band of 748 MHz to 960 MHz, a frequency band of 1450 MHz to 2175 MHz, and a frequency band of 2490 MHz to 2690 MHz.

Patent Document 2 describes an antenna having a triangular conductor. In this antenna, a voltage standing wave ratio (VSWR) equal to or less than 5 is obtained in a frequency band of about 700 MHz to 1000 MHz and a frequency band of about 1500 MHz to 3000 MHz.

RELATED DOCUMENT

Patent Document

Patent Document 1: International Publication No. WO2017/191811

Patent Document 2: U.S. patent Ser. No. 10/305,162

SUMMARY OF THE INVENTION

Technical Problem

An example of an object of the present invention is to enable an antenna to be used stably with high radiation efficiency over a broadband.

Solution to Problem

An aspect of the present invention is an antenna device for vehicle including a first antenna element disposed on a ground, and a second antenna element disposed on the ground, in which at least a portion of the first antenna element and at least a portion of the second antenna element are capacitively coupled.

Advantageous Effects of Invention

According to the above-described aspect, capacitive coupling between the first antenna element and the second antenna element contributes to a low VSWR and high radiation efficiency in a low frequency band. Accordingly, it is possible to enable an antenna to be used stably with high radiation efficiency over a broadband.

DESCRIPTION OF EMBODIMENTS

Figure 1:
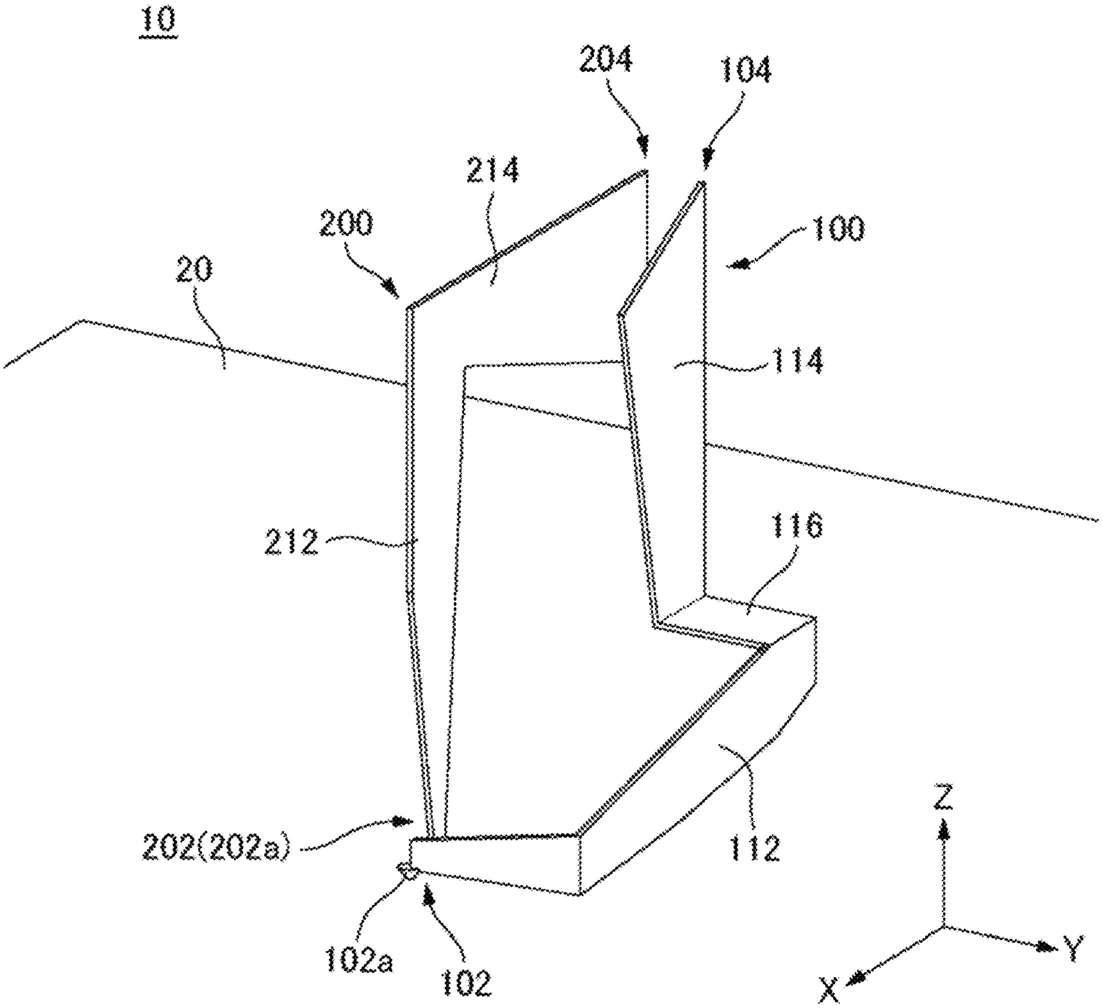
FIG. 1 is a perspective view of an antenna device for vehicle according to Embodiment 1.

Hereinafter, embodiments of the present invention will be described referring to the drawings. In all the drawings, the same components are represented by the same reference numerals and description thereof will not be repeated.

In the specification, ordinal numbers, such as "first", "second", and "third", are attached only for distinguishing configurations to which the same names are attached unless specifically limited, and do not mean particular features (for example, an order or a degree of importance) of the configurations.

Embodiment 1

FIG. 1 is a perspective view of an antenna device 10 for vehicle according to Embodiment 1.

In FIG. 1, a first direction X, a second direction Y, and a third direction Z indicate a front-rear direction, a right-left direction, and an up-down direction of an antenna device 10 for vehicle, respectively. In detail, a positive direction of the first direction X that is a direction of an arrow indicating the first direction X indicates a front direction of the antenna device 10 for vehicle. A negative direction of the first direction X that is an opposite direction of the arrow indicating the first direction X indicates a rear direction of the antenna device 10 for vehicle. A positive direction of the second direction Y that is a direction of an arrow indicating the second direction Y indicates a left direction of the antenna device 10 for vehicle. A negative direction of the second direction Y that is an opposite direction of the arrow indicating the second direction Y indicates a right direction of the antenna device 10 for vehicle. A positive direction of the third direction Z that is a direction of an arrow indicating the third direction Z indicates an up direction of the antenna device 10 for vehicle. A negative direction of the third direction Z that is an opposite direction of the arrow indicating the third direction Z indicates a down direction antenna device 10 for vehicle.

"Front", "rear", "right", "left", "up", and "down" regarding the first direction X, the second direction Y, and the third direction Z of the present embodiment are decided by an automobile on which the antenna device 10 for vehicle is mounted. That is, the front direction is a forward movement direction of the automobile, and the rear direction is a backward movement direction of the automobile. The left direction is a left direction as viewed from the rear side toward the front side of the automobile, and the right direction is a right direction as viewed from the rear side toward the front side of the automobile. The up direction is an up direction of the automobile, and the down direction is a down direction of the automobile. Note that the first direction X, the second direction Y, and the third direction Z may be different from the front-rear direction, the right-left direction, and the up-down direction of the automobile, respectively. For example, the antenna device 10 for vehicle may be used such that the first direction X is directed in the right-left direction of the automobile, and the second direction Y is directed in the front-rear direction of the automobile. Alternatively, for example, the antenna device 10 for vehicle may be used such that the positive direction of the first direction X is directed in the rear direction of the automobile, and the negative direction of the first direction X is directed in the front direction of the automobile.

Hereinafter, the first direction X, the second direction Y, and the third direction Z are referred to as a front-rear direction, a right-left direction, and an up-down direction of the antenna device 10 for vehicle or members that configure the antenna device 10 for vehicle, such as a first antenna element 100 and a second antenna element 200, as necessary, respectively. The positive direction of the first direction X, the negative direction of the first direction X, the positive direction of the second direction Y, the negative direction of the second direction Y, the positive direction of the third direction Z, and the negative direction of the third direction Z are referred to as a front direction, a rear direction, a left direction, a right direction, an up direction, and a down direction of the antenna device 10 for vehicle or the members that configure the antenna device 10 for vehicle, such as the first antenna element 100 and the second antenna element 200, as necessary, respectively.

The antenna device 10 for vehicle includes the first antenna element 100 and the second antenna element 200. The first antenna element 100 and the second antenna element 200 are disposed on a ground 20. The ground 20 is, for example, a roof of the automobile.

The first antenna element 100 is formed by bending sheet metal. Note that a method of forming the first antenna element 100 is not limited thereto.

The first antenna element 100 has a first end 102 and a second end 104.

The first end 102 of the first antenna element 100 is a proximal end of the first antenna element 100. The first end 102 has a feeding portion 102*a*. The feeding portion 102*a* is capable of being fed through a connection member passing through a through-hole formed in the ground 20. The second end 104 of the first antenna element 100 is a distal end of the first antenna element 100. The second end 104 of the first antenna element 100 is an open end at a position away from the ground 20 with respect to the first end 102 of the first antenna element 100. In the present embodiment, the first end 102 is positioned on a positive direction side of the first direction X with respect to the second end 104, and the second end 104 is positioned on a negative direction side of the first direction X with respect to the first end 102. The first end 102 is positioned on a negative direction side of the second direction Y with respect to the second end 104, and the second end 104 is positioned on a positive direction side of the second direction Y with respect to the first end 102. The first end 102 is positioned on a negative direction side of the third direction Z with respect to the second end 104, and the second end 104 is positioned on a positive direction side of the third direction Z with respect to the first end 102.

The first antenna element 100 has a substantially L shape as viewed from the positive direction or the negative direction of the second direction Y. Specifically, the first antenna element 100 has a first portion 112, a second portion 114, and a first step portion 116. The first portion 112, the first step portion 116, and the second portion 114 are arranged in this order from the first end 102 to the second end 104. The first portion 112 is a portion of the first antenna element 100 from the first end 102 to the first step portion 116. Specifically, the first portion 112 includes a portion that extends from the first end 102 toward the positive direction side of the second direction Y, and a portion that extends from a front side of the first antenna element 100 toward a rear side of the first antenna element 100, that is, the first step portion 116. The first portion 112 is bent between the portion of the first portion 112 that extends from the first end 102 toward the positive direction side of the second direction Y and the portion of the first portion 112 that extends from the front side of the first antenna element 100 toward the rear side of the first antenna element 100. Accordingly, an end of the first portion 112 on the first step portion 116 side is positioned on the positive direction side of the second direction Y with respect to an end of the first portion 112 on the first end 102 side. The first step portion 116 extends from the first portion 112 to the second portion 114 from the positive direction side of the second direction Y toward the negative direction side of the second direction Y. The second portion 114 extends from the first step portion 116 to the second end 104 toward the positive direction side of the third direction Z. In a case where the first step portion 116 is provided, it is possible to increase a total length between the first end 102 and the second end 104 of the first antenna element 100 compared to a case where the first step portion 116 is not provided and the first portion 112 and the second portion 114 are directly connected.

A width of the first antenna element 100 increases stepwise or gradually from the first end 102 toward the second end 104. Accordingly, the width of the first antenna element 100 in the vicinity of the second end 104 is wider than the width of the first antenna element 100 in the vicinity of the first end 102, that is, in the vicinity of the feeding portion 102*a*. In this manner, the first antenna element 100 has a self-similar shape formed in a bent shape.

Examples of an antenna having a self-similar shape include an antenna that has a similar shape even though a scale (size ratio) changes, such as a biconical antenna or a bow-tie antenna. As a premise of the antenna having the self-similar shape, the electrical characteristics of the antenna show the same characteristics in principle even though an antenna size or a frequency changes. In actual design, for adjustment of impedance, or the like, an isosceles triangle shape of a radiating element, such as a biconical antenna or a bow-tie antenna, can be deformed and can be changed to a shape, such as the first antenna element 100 in the present embodiment. Even in such a case, it is possible to utilize a certain electrical characteristics that are obtained by the self-similar shape. In the present embodiment, the first antenna element 100 as a part of one radiating element having a self-similar shape is disposed to face the ground 20, whereby the substantially same operational effects as a tapered slot antenna or a bow-tie antenna are obtained in a pseudo manner, and such an operational effect as if another radiating element is virtually disposed on an opposite side to face the radiating element is obtained due to the ground 20.

The second antenna element 200 is formed of sheet metal.

The second antenna element 200 has a third end 202 and a fourth end 204.

The third end 202 of the second antenna element 200 is a proximal end of the second antenna element 200. The third end 202 has a short-circuit portion 202*a*. The short-circuit portion 202*a* is short-circuited to the ground 20. In the present embodiment, the third end 202 and the short-circuit portion 202*a* are positioned behind the first end 102 and the feeding portion 102*a*. The third end 202 and the short-circuit portion 202*a* however may be positioned ahead of the first end 102 and the feeding portion 102*a*. That is, the first end 102 and the feeding portion 102*a*, and the third end 202 and the short-circuit portion 202*a* may be spaced apart from each other. The fourth end 204 of the second antenna element 200 is a distal end of the second antenna element 200. The fourth end 204 of the second antenna element 200 is an open end at a position away from the ground 20 with respect to the third end 202 of the second antenna element 200. In the present embodiment, the third end 202 is positioned on the positive direction side of the first direction X with respect to the fourth end 204, and the fourth end 204 is positioned on the negative direction side of the first direction X with respect to the third end 202. The third end 202 and the fourth end 204 are aligned in the second direction Y without deviating from each other. The third end 202 is positioned on the negative direction side of the third direction Z with respect to the fourth end 204, and the fourth end 204 is positioned on the positive direction side of the third direction Z with respect to the third end 202.

In a case where the third end 202 and the ground 20 are short-circuited by the short-circuit portion 202*a*, it is possible to secure satisfactory characteristics in a low frequency band compared to a case where the third end 202 is electrically opened. The third end 202 however may not have the short-circuit portion 202*a*. For example, the third end 202 may be electrically opened with respect to the ground 20.

The second antenna element 200 has a substantially L shape as viewed from the positive direction or the negative direction of the second direction Y. Specifically, the second antenna element 200 has a third portion 212 and a fourth portion 214. The third portion 212 extends from the third end 202 toward the positive direction side of the third direction Z. The fourth portion 214 extends from an end of the third portion 212 opposite to the third end 202 to the fourth end 204 toward the negative direction side of the first direction X.

A width of the second antenna element 200 increases stepwise or gradually from the third end 202 to the fourth end 204. Accordingly, the width of the second antenna element 200 in the vicinity of the fourth end 204 is wider than the width of the second antenna element 200 in the vicinity of the third end 202, that is, in the vicinity of the short-circuit portion 202*a*. In this manner, the second antenna element 200 has a self-similar shape formed in a bent shape.

In the present embodiment, at least a portion of the first antenna element 100 and at least a portion of the second antenna element 200 are capacitively coupled. Specifically, at least a portion of the second end 104 of the first antenna element 100 and at least a portion of the fourth end 204 of the second antenna element 200 overlap in the second direction Y and are capacitively coupled. The second end 104 of the first antenna element 100 and the fourth end 204 of the second antenna element 200 are spaced apart from each other.

The second end 104 of the first antenna element 100 is inclined obliquely with respect to the ground 20, that is, a plane parallel to an XY plane. More specifically, the second end 104 is inclined obliquely toward the positive direction side of the third direction Z from the positive direction side of the first direction X toward the negative direction side of the first direction X. An area where the second end 104 of the first antenna element 100 and the fourth end 204 of the second antenna element 200 are superimposed in the second direction Y is adjusted by the inclination of the second end 104, that is, the shape of the second end 104, whereby it is possible to adjust a capacitive coupling between the second end 104 of the first antenna element 100 and the fourth end 204 of the second antenna element 200. An area where the second end 104 of the first antenna element 100 and the fourth end 204 of the second antenna element 200 are superimposed in the second direction Y is adjusted by the shape of the fourth end 204, whereby it is possible to adjust a capacitive coupling between the second end 104 of the first antenna element 100 and the fourth end 204 of the second antenna element 200. The capacitive coupling between the second end 104 of the first antenna element 100 and the fourth end 204 of the second antenna element 200 can also be adjusted by a distance between the second end 104 and the fourth end 204.

The first antenna element 100 and the second antenna element 200 do not overlap in the second direction Y except for a portion in the vicinity of the first end 102, a portion in the vicinity of the third end 202, a portion in the vicinity of the second end 104, and a portion in the vicinity of the fourth end 204.

It is preferable that a length between the third end 202 and the fourth end 204 of the second antenna element 200 is substantially equal to a length between the first end 102 and the second end 104 of the first antenna element 100. For example, a difference between the length between the first end 102 and the second end 104 of the first antenna element 100 and the length between the third end 202 and the fourth end 204 of the second antenna element 200 may be within ±25% of the length between the first end 102 and the second end 104 of the first antenna element 100 or the length between the third end 202 and the fourth end 204 of the second antenna element 200. In this manner, it is possible to enable the antenna to be used stably with high radiation efficiency over a broadband. Here, the length between the third end 202 and the fourth end 204 of the second antenna element 200 may be a length of an outer edge between the third end 202 and the fourth end 204 in the second antenna element 200 or a length of an inner edge between the third end 202 and the fourth end 204 in the second antenna element 200. In the same manner, the length between the first end 102 and the second end 104 of the first antenna element 100 may be a length of an outer edge between the first end 102 and the second end 104 in the first antenna element 100 or a length of an inner edge between the first end 102 and the second end 104 in the first antenna element 100. Alternatively, a length of a center line of the width of each of the first antenna element 100 and the second antenna element 200 may be used.

It is assumed that the antenna device 10 for vehicle according to the present embodiment operates in accordance with the following principle.

From a high frequency band to a medium frequency band of the operation frequency band of the antenna device 10 for vehicle, the first portion 112 of the first antenna element 100 functions as a self-similar shape or an equivalent tapered antenna, and the second portion 114 of the first antenna element 100 functions as a monopole antenna with the first portion 112 functioning as a transmission path.

From the medium frequency band to a low frequency band of the operation frequency band of the antenna device 10 for vehicle, the second portion 114 of the first antenna element 100 functions as a monopole antenna with the first portion 112 functioning as a transmission path, and the second portion 114 of the first antenna element 100 and the second antenna element 200 function as a loop antenna or a split ring antenna with the first portion 112 functioning as a transmission path.

With the above, the first antenna element 100 and the second antenna element 200 are operable over a broadband, and specifically, over at least 698 MHz to 6 GHz. Although the first antenna element 100 and the second antenna element are designed to operate over 698 MHz to 6 GHz in the present embodiment, it can be assumed from FIGS. 3, 4, and the like that the first antenna element 100 and the second antenna element 200 are operable over other frequency bands, such as 617 MHz to 5 GHz or 5.9 GHz to 7.1 GHz, in addition to 698 MHz to 6 GHz or instead of 698 MHz to 6 GHz. Accordingly, design can withstand a requirement for a broader frequency band or a higher frequency band.

Figure 2:
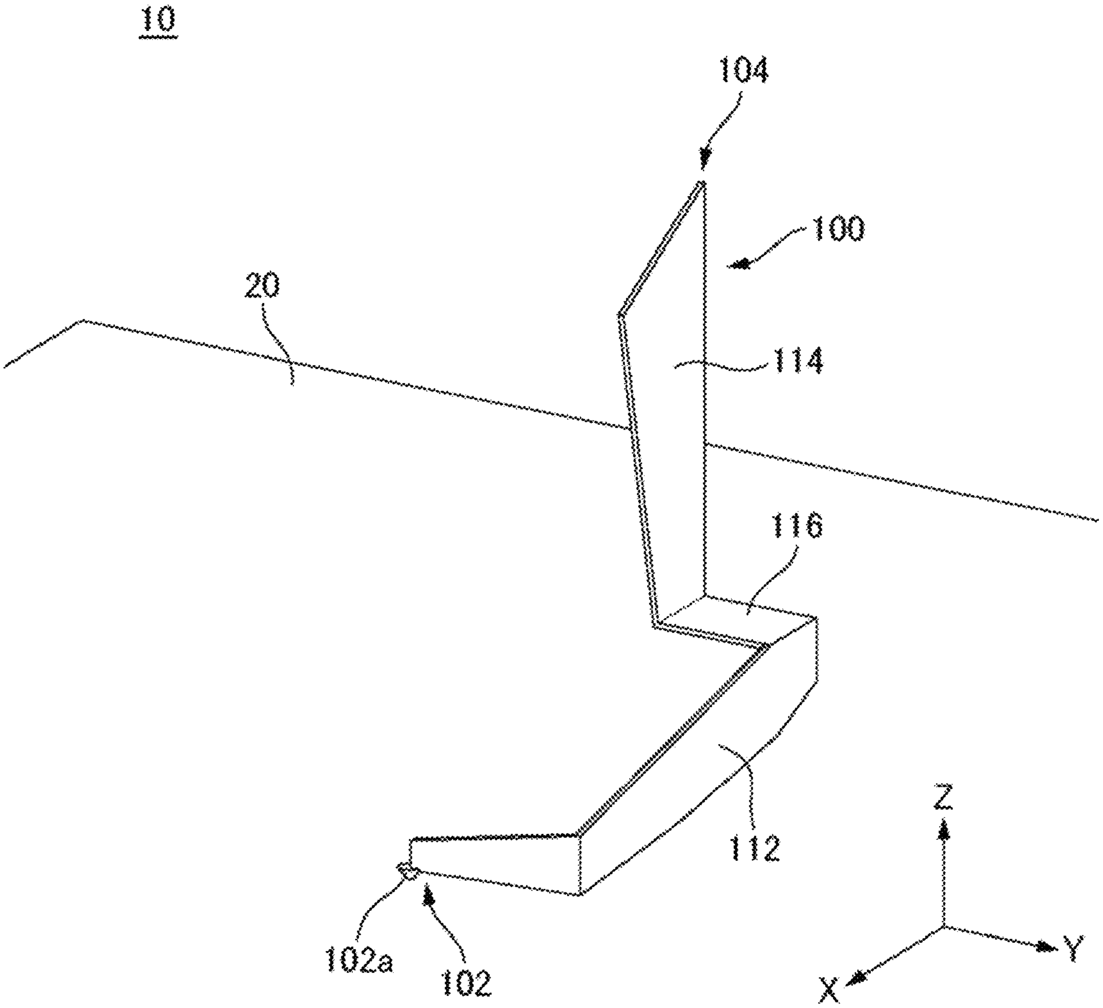
FIG. 2 is a perspective view of an antenna device for vehicle according to a comparative embodiment.

FIG. 2 is a perspective view of an antenna device 10 for vehicle according to a comparative embodiment. The antenna device 10 for vehicle according to the comparative embodiment is the same as the antenna device 10 for vehicle according to Embodiment 1, except that the second antenna element 200 is not provided.

Figure 3:
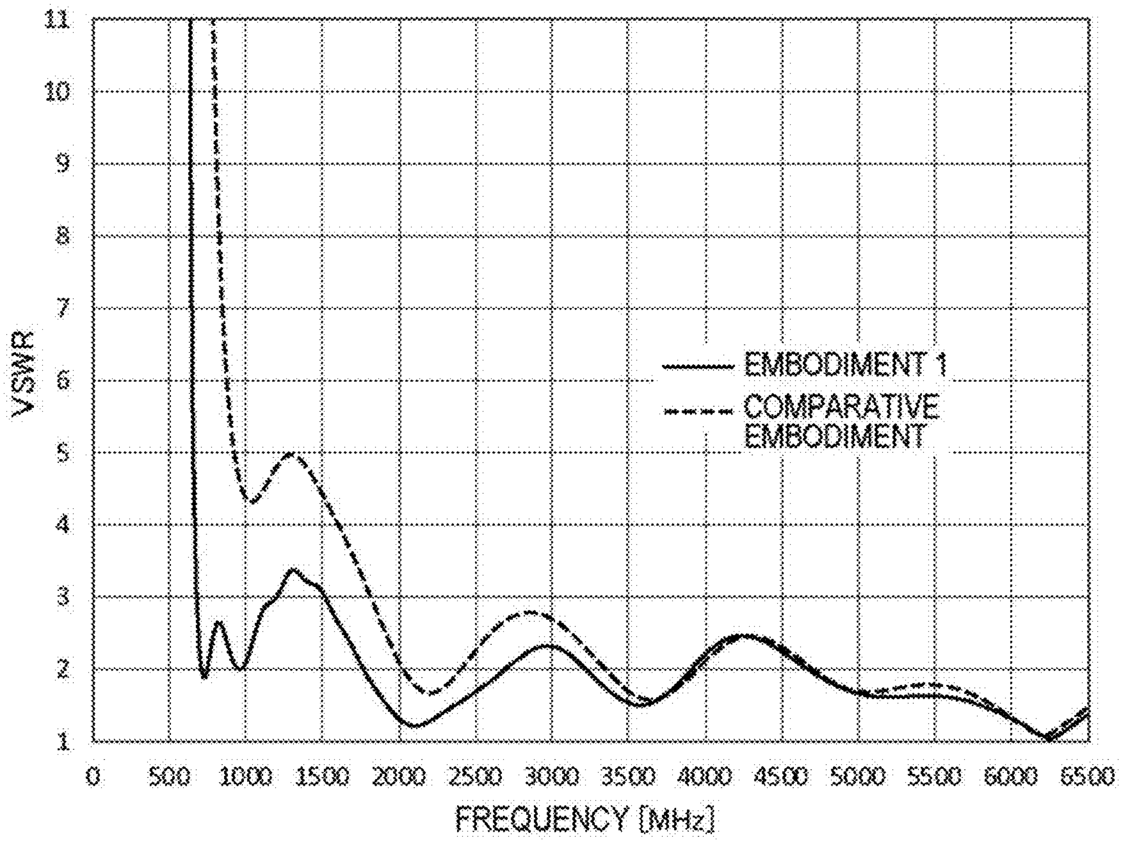
FIG. 3 is a graph showing VSWR characteristics of the antenna device for vehicle according to Embodiment 1 and the antenna device for vehicle according to the comparative embodiment.
Figure 4:
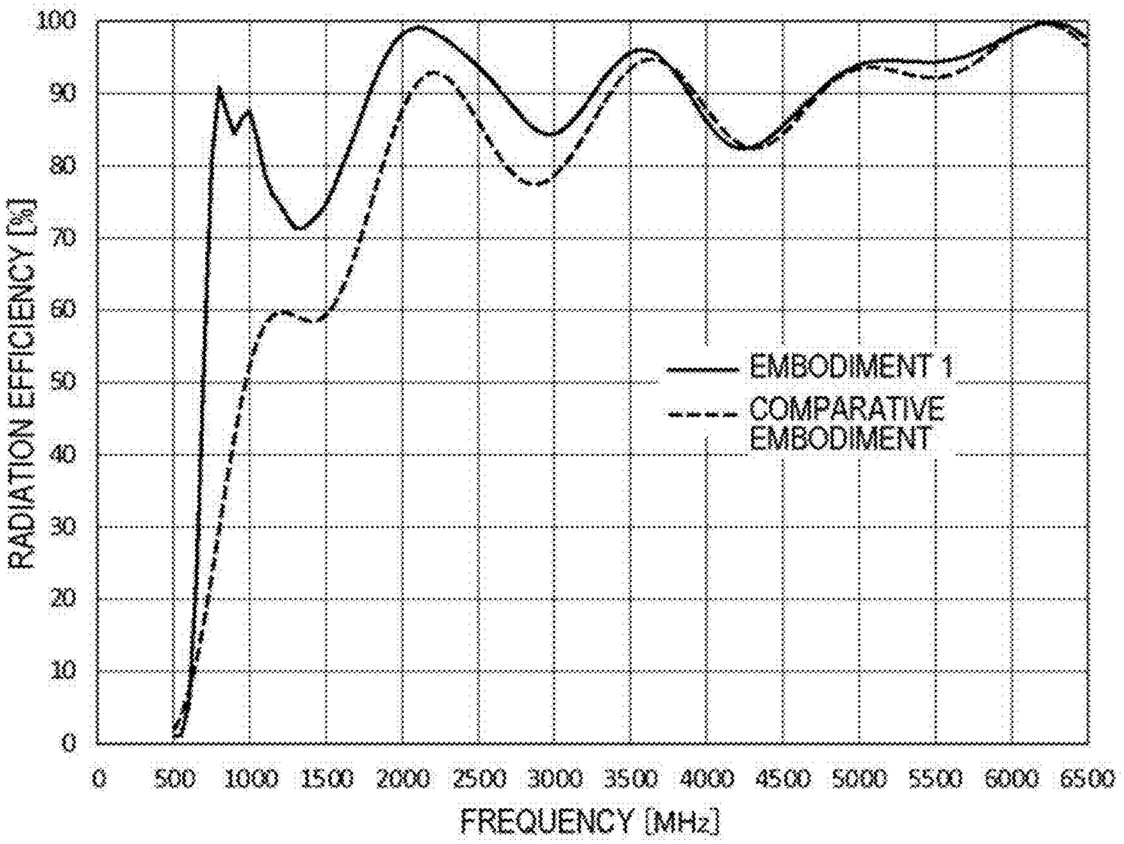
FIG. 4 is a graph showing radiation efficiency characteristics of the antenna device for vehicle according to Embodiment 1 and the antenna device for vehicle according to the comparative embodiment.

FIG. 3 is a graph showing VSWR characteristics of the antenna device 10 for vehicle according to Embodiment 1 and the antenna device 10 for vehicle according to the comparative embodiment. FIG. 4 is a graph showing radiation efficiency characteristics of the antenna device 10 for vehicle according to Embodiment 1 and the antenna device 10 for vehicle according to the comparative embodiment.

A horizontal axis of the graph of FIG. 3 indicates a frequency. A vertical axis of the graph of FIG. 3 indicates a VSWR. A solid line in the graph of FIG. 3 indicates the VSWR characteristic of the antenna device 10 for vehicle according to Embodiment 1. A broken line in the graph of FIG. 3 indicates the VSWR characteristic of the antenna device 10 for vehicle according to the comparative embodiment.

A horizontal axis of the graph of FIG. 4 indicates a frequency. A vertical axis of the graph of FIG. 4 indicates radiation efficiency. A solid line in the graph of FIG. 4 indicates the radiation efficiency characteristic of the antenna device 10 for vehicle according to Embodiment 1. A broken line in the graph of FIG. 4 indicates the radiation efficiency characteristic of the antenna device 10 for vehicle according to the comparative embodiment.

As shown in FIG. 3, in a comparatively low frequency band of about 700 MHz to 1750 MHz, the VSWR of Embodiment 1 is lower than the VSWR of the comparative embodiment. As shown in FIG. 4, in a comparatively low frequency band of about 700 MHz to 1750 MHz, the radiation efficiency of Embodiment 1 is higher than the radiation efficiency of the comparative embodiment. Accordingly, capacitive coupling between the first antenna element 100 and the second antenna element 200 could contribute to a low VSWR and high radiation efficiency in a comparatively low frequency band.

As shown in FIG. 3, the VSWR of Embodiment 1 is as low as less than 3.5 over a broadband of 700 MHz to 6500 MHz. As shown in FIG. 4, the radiation efficiency of Embodiment 1 is as high as greater than 60% over a broadband of 700 MHz to 6500 MHz. In contrast, in the antenna of Patent Document 1, a return loss is equal to or greater than −5 dB in a frequency band of about 960 MHz to 1450 MHz. In the antenna of Patent Document 2, the VSWR is equal to or greater than 5 in a frequency band of about 1000 MHz to 1500 MHz. Accordingly, the antenna device 10 for vehicle according to Embodiment 1 can be used stably with high radiation efficiency over a broadband compared to the antennas of Patent Documents 1 and 2.

Figure 5:
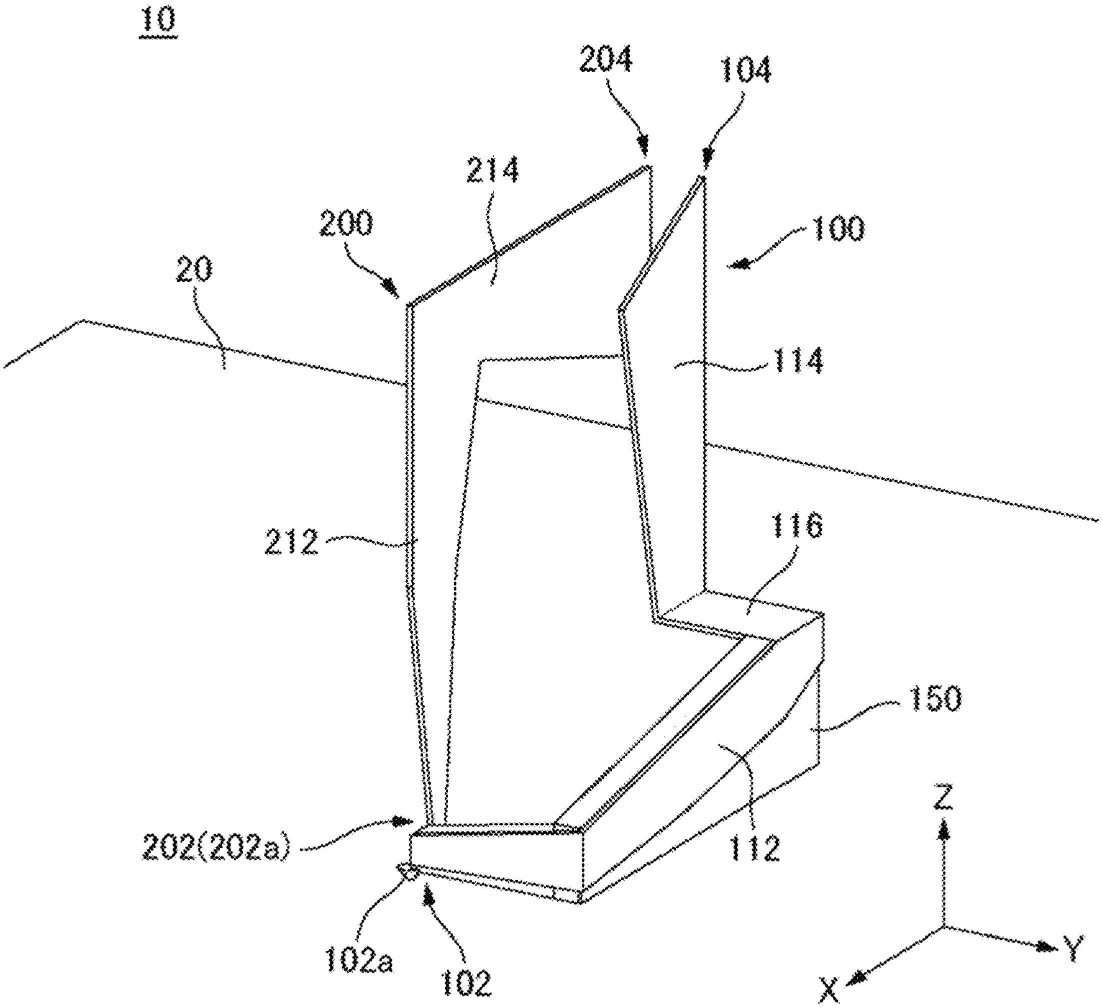
FIG. 5 is a diagram showing a modification example of FIG. 1.

FIG. 5 is a diagram showing a modification example of FIG. 1. An antenna device 10 for vehicle according to the modification example is the same as the antenna device 10 for vehicle according to Embodiment 1, except for the following point.

The antenna device 10 for vehicle further includes a dielectric 150. As described below in detail, the antenna device 10 for vehicle has the dielectric 150 in at least a portion of the first antenna element 100 or the second antenna element 200.

The dielectric 150 is attached to at least a portion of the first antenna element 100. Specifically, the dielectric 150 is attached to an inside surface of the first portion 112 of the first antenna element 100. The dielectric 150 may be attached to at least one of the inside surface of the first portion 112 and an outside surface of the first portion 112. The dielectric 150 may be attached to at least a portion of the second antenna element 200. For example, the dielectric 150 may be attached to at least one of a surface of the second antenna element 200 on the positive direction side of the second direction Y and a surface of the second antenna element 200 on the negative direction side of the second direction Y. At least a portion of the dielectric 150 may be provided over at least a portion of the first antenna element 100 and at least a portion of the second antenna element 200.

Figure 6:
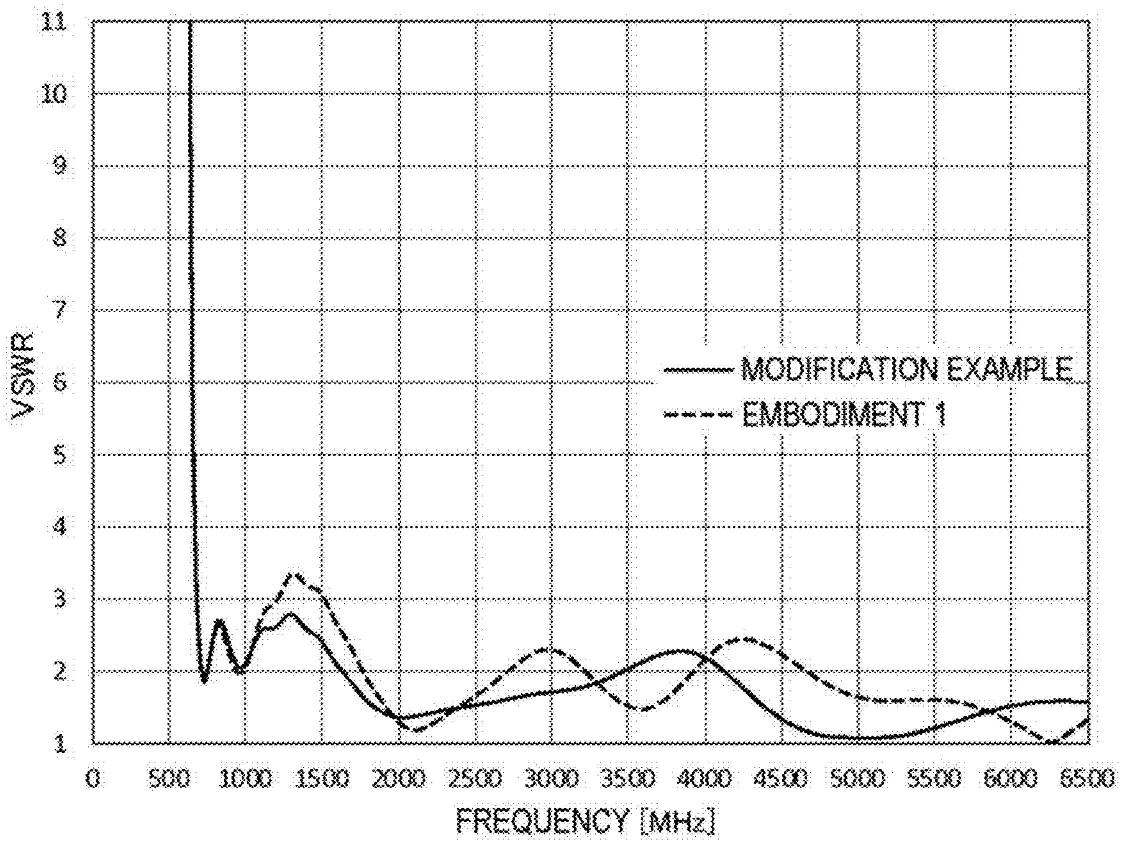
FIG. 6 is a graph showing VSWR characteristics of the antenna device for vehicle according to the modification example and the antenna device for vehicle according to Embodiment 1.
Figure 7:
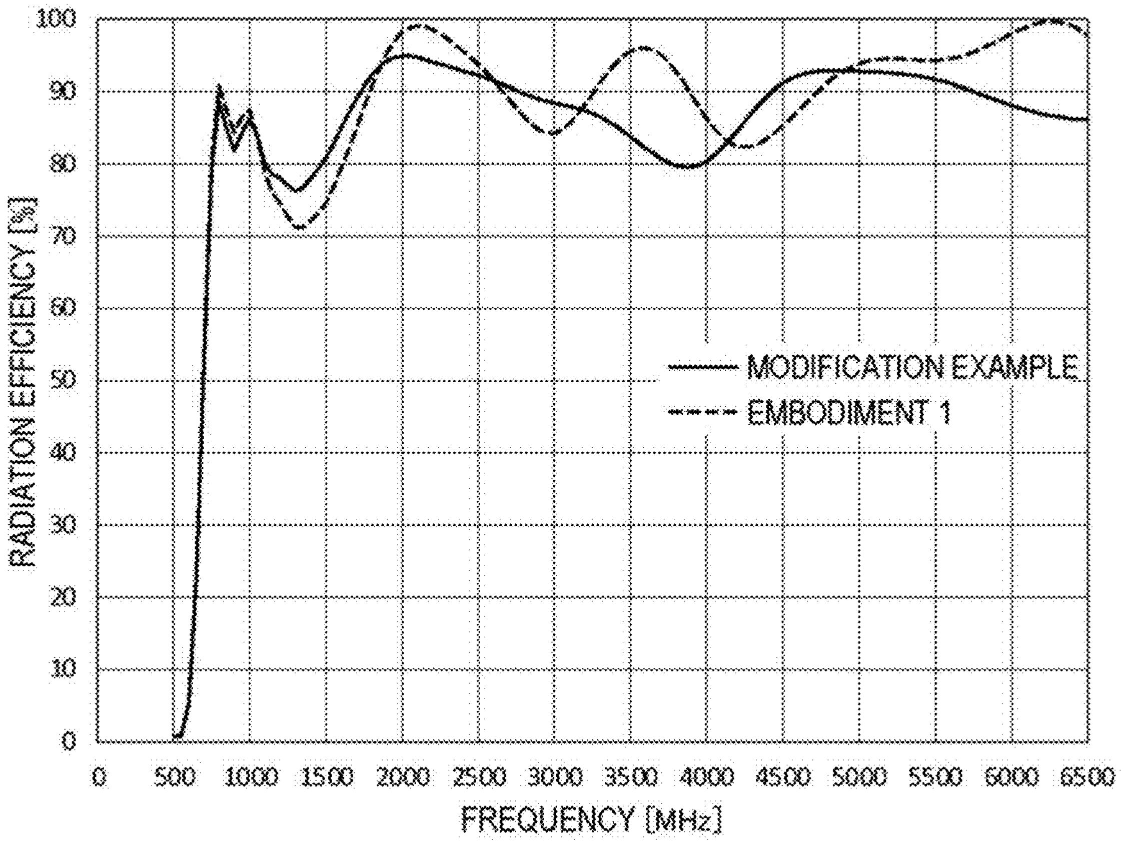
FIG. 7 is a graph showing radiation efficiency characteristics of the antenna device for vehicle according to the modification example and the antenna device for vehicle according to Embodiment 1.

FIG. 6 is a graph showing VSWR characteristics of the antenna device 10 for vehicle according to the modification example and the antenna device 10 for vehicle according to Embodiment 1. FIG. 7 is a graph showing radiation efficiency characteristics of the antenna device 10 for vehicle according to the modification example and the antenna device 10 for vehicle according to Embodiment 1.

A horizontal axis of the graph of FIG. 6 indicates a frequency. A vertical axis of the graph of FIG. 6 indicates a VSWR. A solid line in the graph of FIG. 6 indicates the VSWR characteristic of the antenna device 10 for vehicle according to the modification example. A broken line in the graph of FIG. 6 indicates the VSWR characteristic of the antenna device 10 for vehicle according to Embodiment 1.

A horizontal axis of the graph of FIG. 7 indicates a frequency. A vertical axis of the graph of FIG. 7 indicates radiation efficiency. A solid line in the graph of FIG. 7 indicates the radiation efficiency characteristic of the antenna device 10 for vehicle according to the modification example. A broken line in the graph of FIG. 7 indicates the radiation efficiency characteristic of the antenna device 10 for vehicle according to Embodiment 1.

As shown in FIG. 6, the VSWR of each of the modification example and Embodiment 1 is as low as less than 3.5 over a broadband of 700 MHz to 6500 MHz. As shown in FIG. 7, the radiation efficiency of each of the modification example and Embodiment 1 is as high as greater than 60% over a broadband of 700 MHz to 6500 MHz.

As shown in FIG. 6, the VSWR of the modification example is less than 3 at any of a frequency band equal to or higher than 1000 MHz. In contrast, the VSWR of Embodiment 1 is greater than 3 in the vicinity of 1250 MHz of the frequency band equal to or higher than 1000 MHz. Accordingly, the dielectric 150 of the modification example could contribute to smoothing of the VS % R characteristic.

As shown in FIG. 7, the radiation efficiency of the modification example is greater than 75, at any of the frequency band equal to or higher than 1000 MHz. In contrast, the radiation efficiency of Embodiment 1 is less than 75% in the vicinity of 1250 MHz of the frequency band equal to or higher than 1000 MHz. Accordingly, the dielectric 150 of the modification example could contribute to smoothing of the radiation efficiency characteristic.

Embodiment 2

Figure 8:
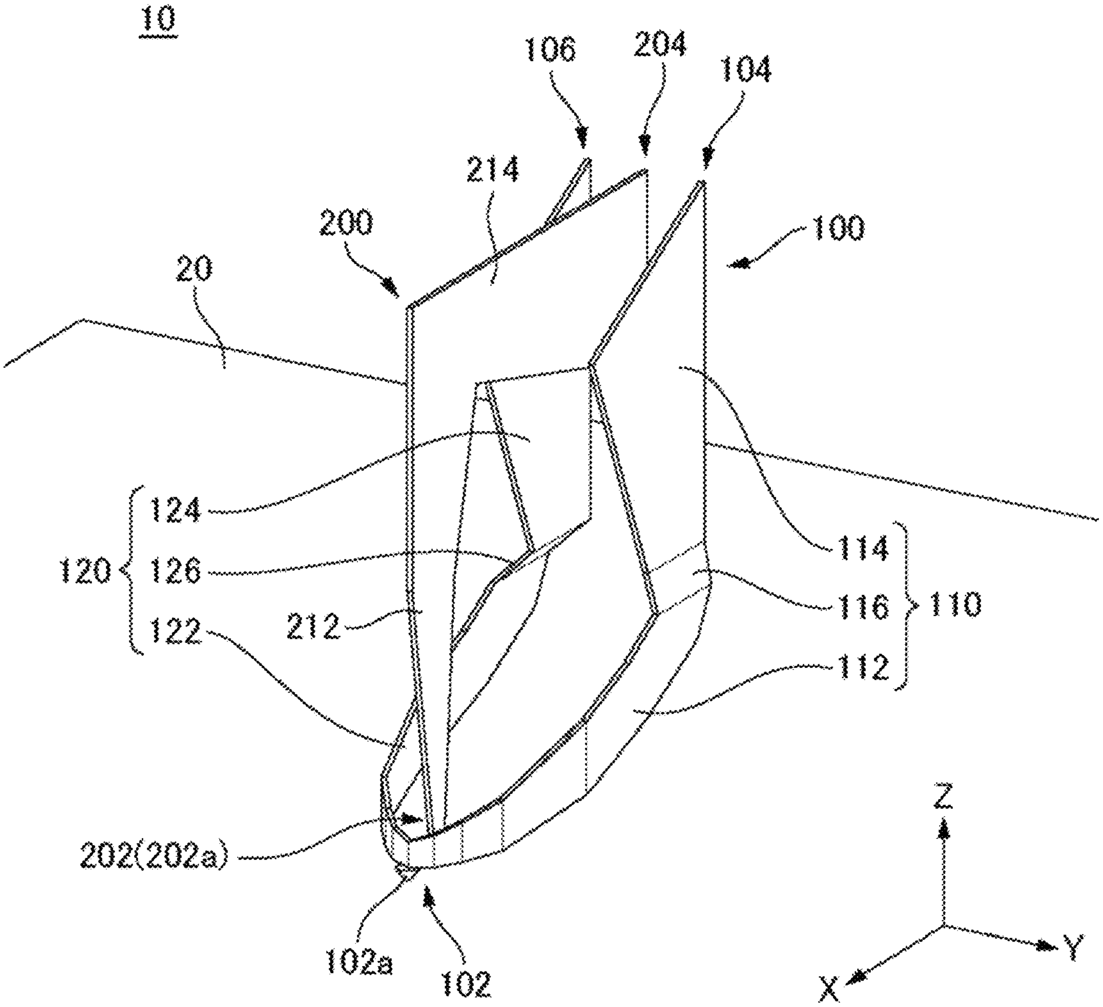
FIG. 8 is a perspective view of an antenna device for vehicle according to Embodiment 2.

FIG. 8 is a perspective view of an antenna device 10 for vehicle according to Embodiment 2. The antenna device 10 for vehicle according to Embodiment 2 is the same as the antenna device 10 for vehicle according to Embodiment 1, except for the following points.

A first antenna element 100 has a fifth end 106 in addition to a first end 102 and a second end 104. The second end 104 and the fifth end 106 are on opposite sides of the first end 102. The first end 102, that is, a feeding portion **102*a* is positioned at the substantially center of the first antenna element 100**.

The fifth end 106 of the first antenna element 100 is a distal end of the first antenna element 100. The fifth end 106 of the first antenna element 100 is an open end at a position away from the ground 20 with respect to the first end 102 of the first antenna element 100. In the present embodiment, the first end 102 is positioned on the positive direction side of the first direction X with respect to the fifth end 106, and the fifth end 106 is positioned on the negative direction side of the first direction X with respect to the first end 102. The first end 102 is positioned on the positive direction side of the second direction Y with respect to the fifth end 106, and the fifth end 106 is positioned on the negative direction side of the second direction Y with respect to the first end 102. The first end 102 is positioned on the negative direction side of the third direction Z with respect to the fifth end 106, and the fifth end 106 is positioned on the positive direction side of the third direction Z with respect to the first end 102.

The first antenna element 100 has a substantially U shape in an expanded state. Specifically, the first antenna element 100 has a fifth portion 122, a sixth portion 124, and a second step portion 126 in addition to a first portion 112, a second portion 114, and a first step portion 116. The fifth portion 122, the sixth portion 124, and the second step portion 126 have shapes substantially symmetrical to the first portion 112, the second portion 114, and the first step portion 116 about the first end 102. The fifth portion 122, the second step portion 126, and the sixth portion 124 are arranged in this order from the first end 102 to the fifth end 106. The fifth portion 122 extends from the first end 102 toward the negative direction side of the first direction X. The fifth portion 122 is bent between the first end 102 and the second step portion 126. Accordingly, an end of the fifth portion 122 on a second step portion 126 side is positioned on the negative direction side of the second direction Y with respect to an end of the fifth portion 122 on a first end 102 side. The second step portion 126 extends from the fifth portion 122 to the sixth portion 124 from the negative direction side of the second direction Y toward the positive direction side of the second direction Y. The sixth portion 124 extends from the second step portion 126 to the second end 104 toward the positive direction side of the third direction Z. In a case where the second step portion 126 is provided, it is possible to increase a total length between the first end 102 and the fifth end 106 of the first antenna element 100 compared to a case where the second step portion 126 is not provided and the fifth portion 122 and the sixth portion 124 are directly connected.

In the same manner as the width of the first antenna element 100 from the first end 102 to the second end 104 described in Embodiment 1, a width of the first antenna element 100 increases stepwise or gradually from the first end 102 to the fifth end 106. Accordingly, the width of the first antenna element 100 in the vicinity of the fifth end 106 is wider than the width of the first antenna element 100 in the vicinity of the first end 102, that is, in the vicinity of the feeding portion **102*a***. Here, "increase stepwise" means, for example, increase with a step, such as a step shape, and "increases gradually" means, for example, increases smoothly and steadily with no step.

The first antenna element 100 has a first region 110 including the first portion 112, the second portion 114, and the first step portion 116 positioned on one side of the second antenna element 200, that is, on the positive direction side of the second direction Y of the second antenna element 200. The first antenna element 100 has a second region 120 including the fifth portion 122, the sixth portion 124, and the second step portion 126 positioned on the other side opposite to the one side of the second antenna element 200, that is, on the negative direction side of the second direction Y of the second antenna element 200.

At least a portion of the first region 110 of the first antenna element 100 and at least a portion of the second antenna element 200 are capacitively coupled. At least a portion of the second region 120 of the first antenna element 100 and at least a portion of the second antenna element. 200 are capacitively coupled. Specifically, in the same manner as in Embodiment 1, at least a portion of the second end 104 of the first antenna element 100 and at least a portion of the fourth end 204 of the second antenna element 200 overlap in the second direction Y and are capacitively coupled. The second end 104 of the first antenna element 100 and the fourth end 204 of the second antenna element 200 are spaced apart from each other. At least a portion of the fifth end 106 of the first antenna element 100 and at least a portion of the fourth end 204 of the second antenna element 200 overlap in the second direction Y and are capacitively coupled. The fifth end 106 of the first antenna element 100 and the fourth end 204 of the second antenna element 200 are spaced apart from each other.

In the same manner as the second end 104 of the first antenna element 100 described in Embodiment 1, the fifth end 106 of the first antenna element 100 is inclined obliquely with respect to the ground 20, that is, a plane parallel to an XY plane. More specifically, the fifth end 106 is inclined obliquely toward the positive direction side of the third direction Z from the positive direction side of the first direction X toward the negative direction side of the first direction X.

The first region 110 of the first antenna element 100 and the second antenna element 200 do not overlap in the second direction Y, except for portions in the periphery of the first end 102 and the third end 202 and portions in the periphery of the second end 104 and the fourth end 204. The second region 120 of the first antenna element 100 and the second antenna element 200 do not overlap in the second direction Y, except for portions in the periphery of the first end 102 and the third end 202 and portions in the periphery of the fifth end 106 and the fourth end 204.

Figure 9:
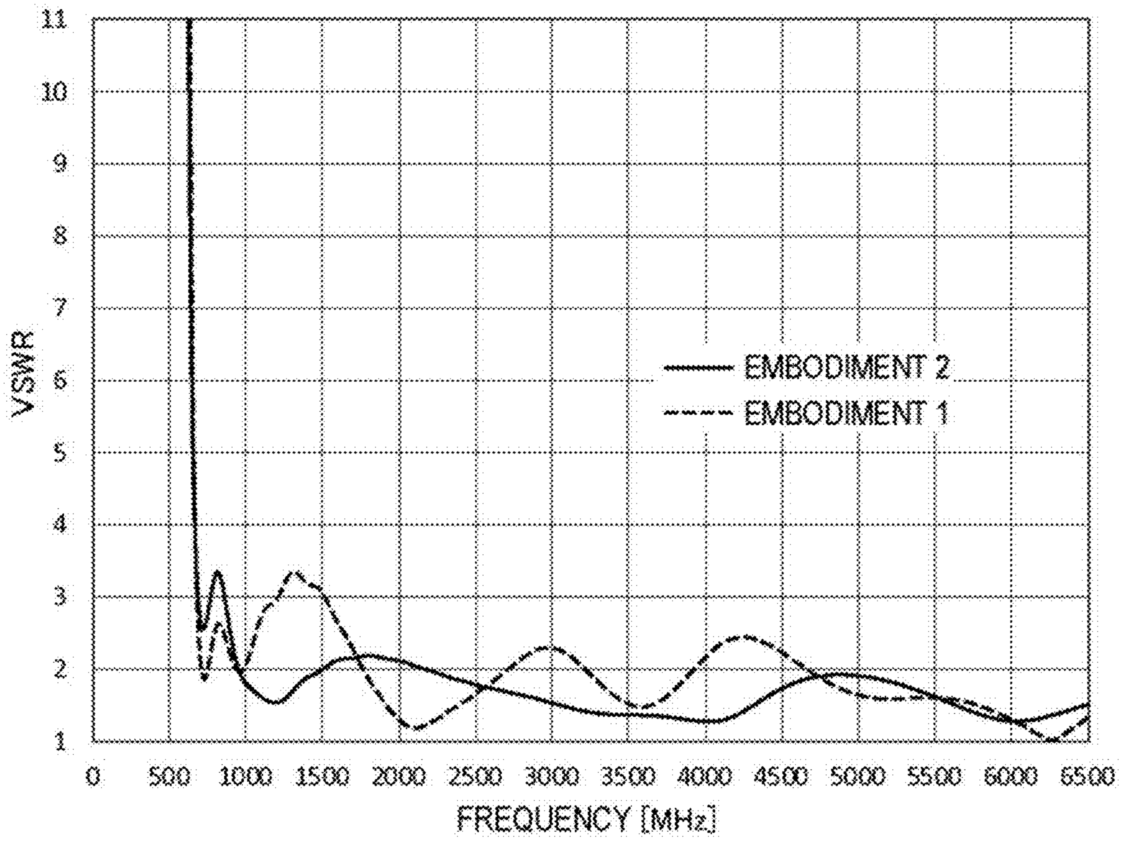
FIG. 9 is a graph showing VSWR characteristics of the antenna device for vehicle according to Embodiment 2 and the antenna device for vehicle according to Embodiment 1.

FIG. 9 is a graph showing VSWR characteristics of the antenna device 10 for vehicle according to Embodiment 2 and the antenna device 10 for vehicle according to Embodiment 1. FIG. is a graph showing radiation efficiency characteristics of the antenna device 10 for vehicle according to Embodiment 2 and the antenna device 10 for vehicle according to Embodiment 1.

A horizontal axis of the graph of FIG. 9 indicates a frequency. A vertical axis of the graph of FIG. 9 indicates a VSWR. A solid line in the graph of FIG. 9 indicates the VSWR characteristic of the antenna device 10 for vehicle according to Embodiment 2. A broken line in the graph of FIG. 9 indicates the VSWR characteristic of the antenna device 10 for vehicle according to Embodiment 1.

Figure 10:
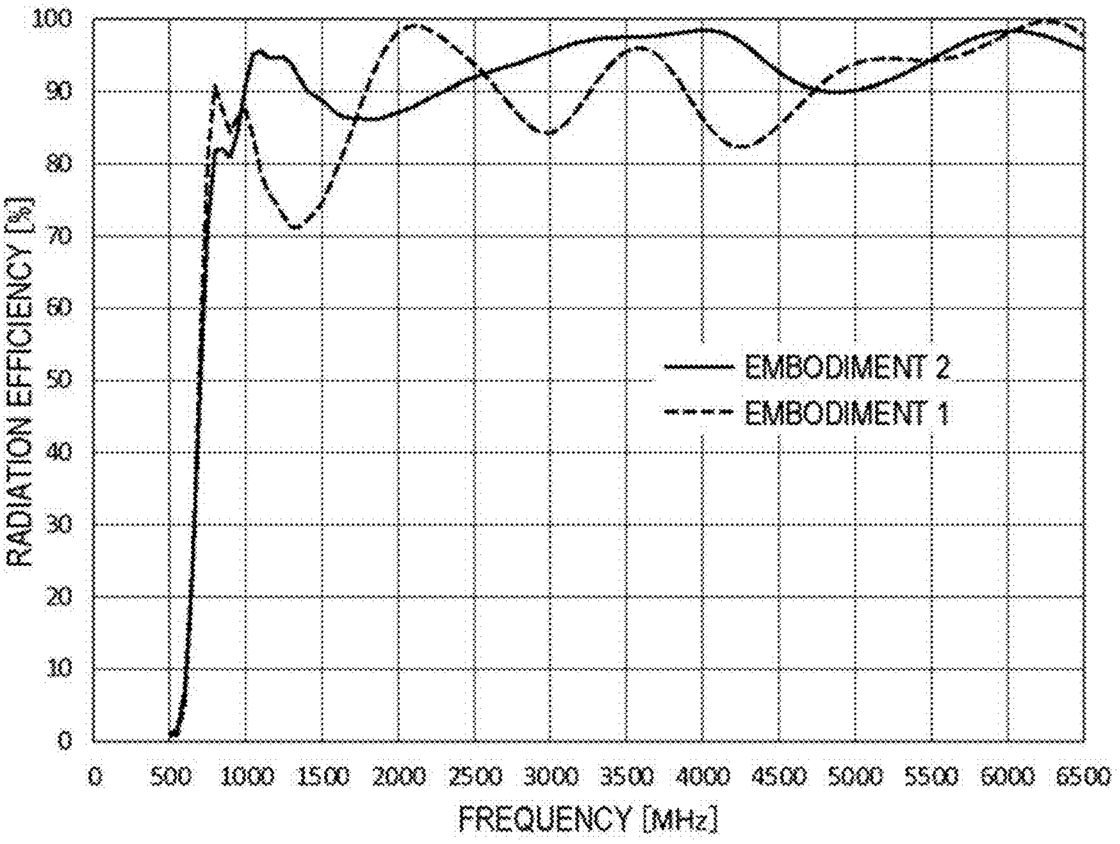
FIG. 10 is a graph showing radiation efficiency characteristics of the antenna device for vehicle according to Embodiment 2 and the antenna device for vehicle according to Embodiment 1.

A horizontal axis of the graph of FIG. 10 indicates a frequency. A vertical axis of the graph of FIG. 10 indicates radiation efficiency. A solid line in the graph of FIG. 10 indicates the radiation efficiency characteristic of the antenna device 10 for vehicle according to Embodiment 2. A broken line in the graph of FIG. 10 indicates the radiation efficiency characteristic of the antenna device 10 for vehicle according to Embodiment 1.

As shown in FIG. 9, the VSWR of Embodiment 2 is less than 2.5 at any of the frequency band equal to or higher than 1000 MHz. In contrast, the VSWR of Embodiment 1 is greater than 2.5 in the vicinity of 1250 MHz of the frequency band equal to or higher than 1000 MHz. Accordingly, the second region 120 of the first antenna element 100 of Embodiment 2 could contribute to smoothing of the VSWR characteristic.

As shown in FIG. 10, the radiation efficiency of Embodiment 2 is greater than 85% at any of the frequency band equal to or higher than 1000 MHz. In contrast, the radiation efficiency of Embodiment 1 is less than 85% in the vicinity of 1250 MHz of the frequency band equal to or higher than 1000 MHz. Accordingly, the second region 120 of the first antenna element 100 of Embodiment 2 could contribute to smoothing of the radiation efficiency characteristic.

Figure 11:
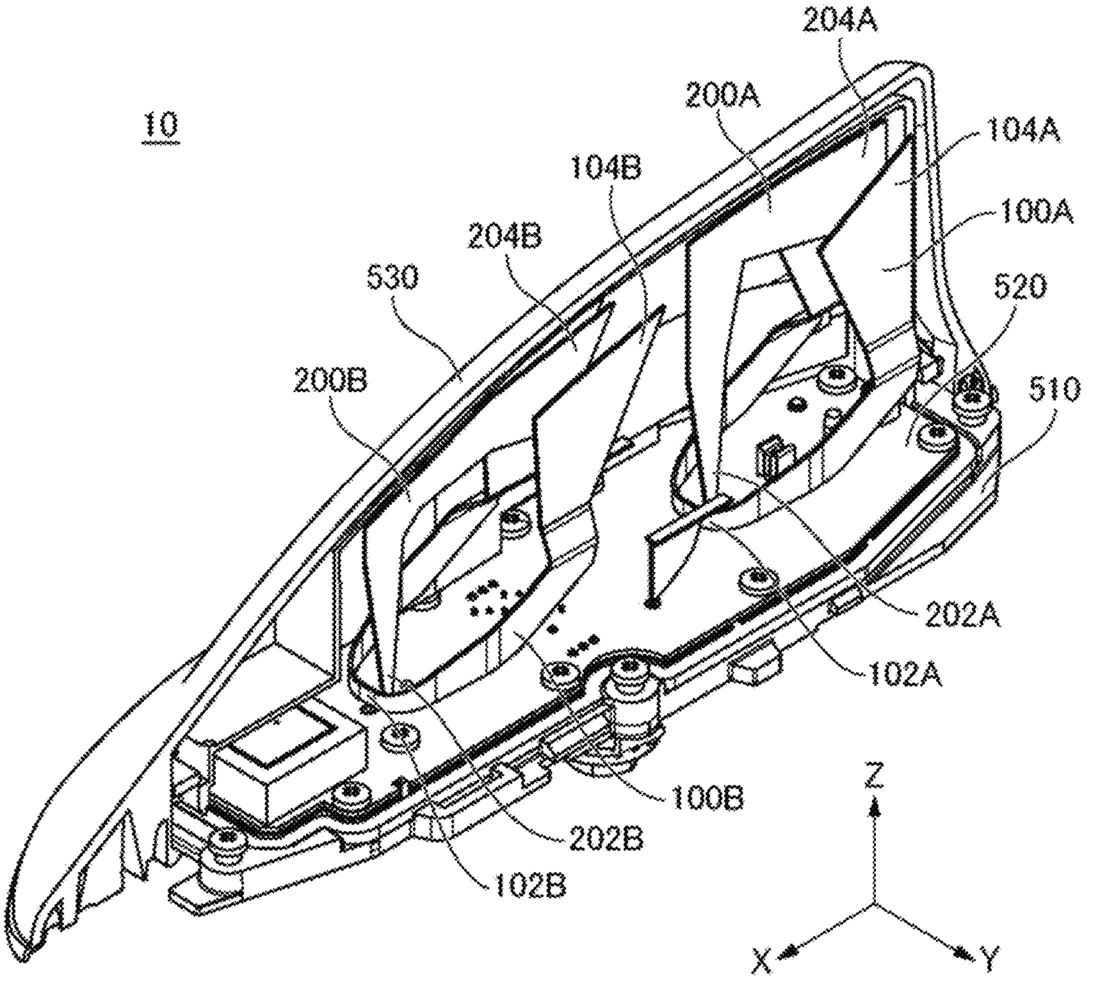
FIG. 11 is a perspective view of a first example of the whole of the antenna device for vehicle according to Embodiment 2.
Figure 12:
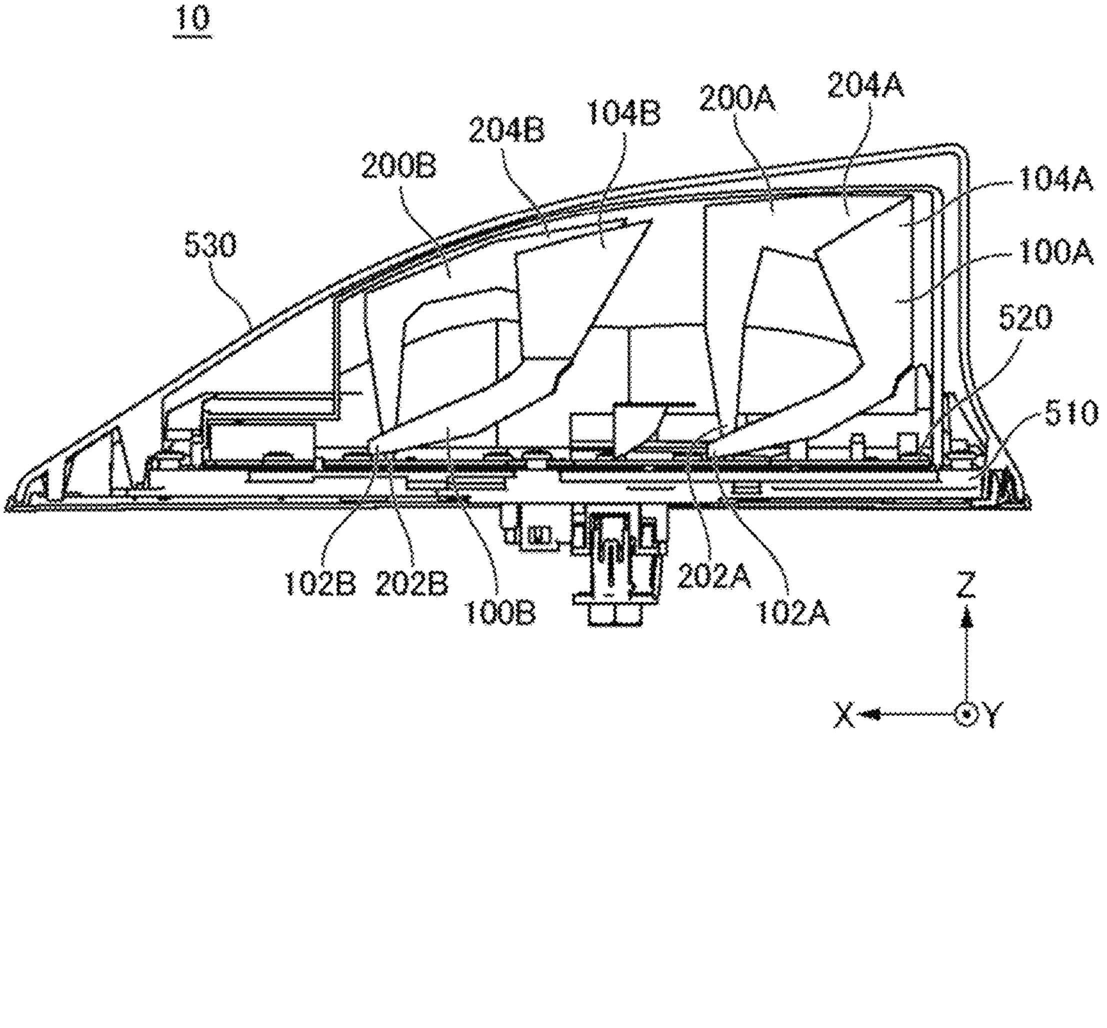
FIG. 12 is a left side view of the first example of the whole of the antenna device for vehicle shown in FIG. 11.
Figure 13:
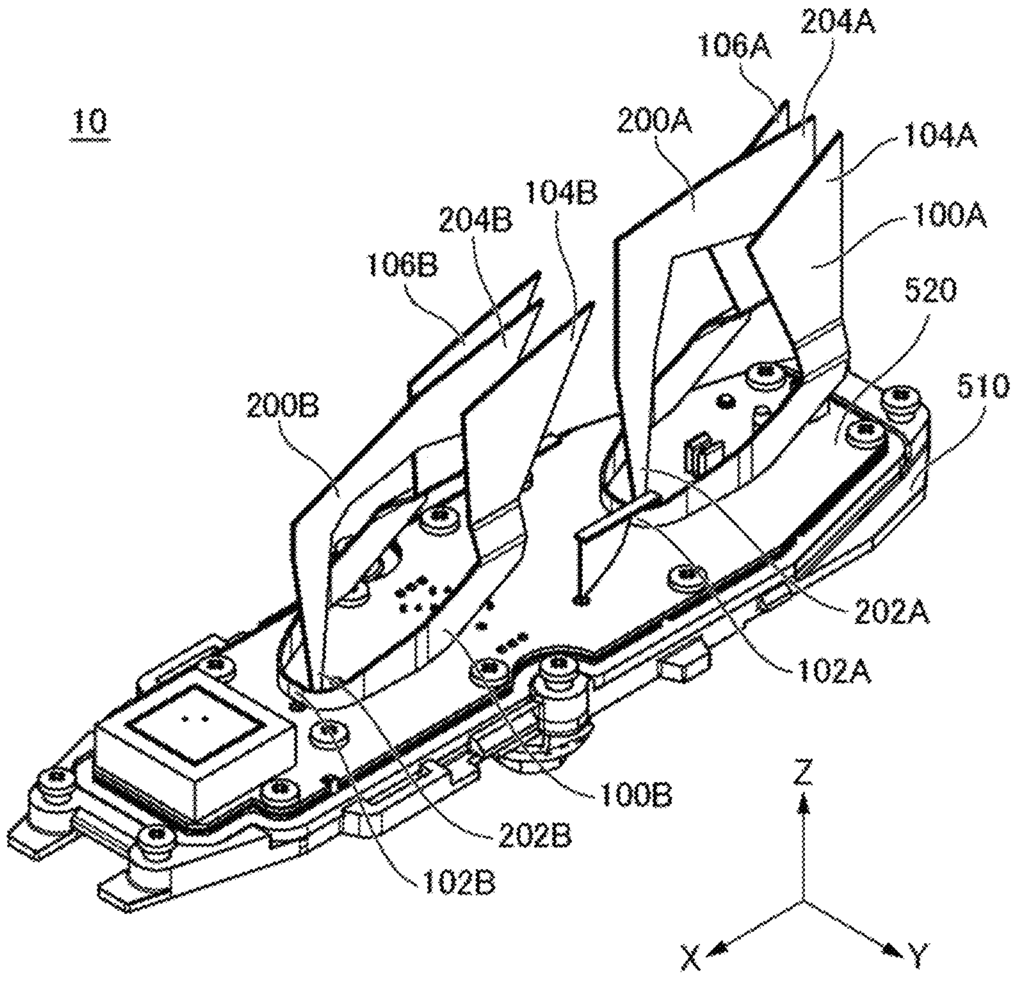
FIG. 13 is a diagram with an antenna case removed from FIG. 11.

FIG. 11 is a perspective view of a first example of the whole of the antenna device 10 for vehicle according to Embodiment 2. FIG. 12 is a left side view of the first example of the whole of the antenna device 10 for vehicle shown in FIG. 11. FIG. 13 is a diagram with an antenna case 530 removed from FIG. 11. In FIGS. 11 and 12, a left portion of the antenna case 530 is removed.

The antenna device 10 for vehicle includes an antenna base 510, a substrate 520, and an antenna case 530. The antenna base 510 is, for example, a conductive base, such as a metal base. Alternatively, the antenna base 510 may have both a conductive base and an insulating base. The antenna base 510 may have a conductive base, an insulating base, and a metallic plate or may have a metallic plate and an insulating base. The substrate 520 is, for example, a printed circuit board (PCB). The substrate 520 is provided on an upper surface side of the antenna base 510. On an upper surface side of the substrate 520, two antennas, that is, a rear antenna having a first antenna element 100A and a second antenna element 200A, and a front antenna having a first antenna element 100B and a second antenna element 200B are provided. The antenna base 510 and the antenna case 530 form an accommodation space for accommodating the substrate 520 and the two antennas.

The rear first antenna element 100A has a first end 102A, a second end 104A, and a fifth end 106A in the same manner as the first antenna element 100 shown in FIG. 8. The rear second antenna element 200A has a third end 202A and a fourth end 204A in the same manner as the second antenna element 200 shown in FIG. 8.

The front first antenna element 100B has a first end 102B, a second end 104B, and a fifth end 106B in the same manner as the first antenna element 100 shown in FIG. 8. The front second antenna element 200B has a third end 202B and a fourth end 204B in the same manner as the second antenna element 200 shown in FIG. 8.

In the present embodiment, the antenna having the first antenna element 100A and the second antenna element 200A, and the antenna having the first antenna element 100B and the second antenna element 200B are arranged in the front-rear direction of the antenna device 10 for vehicle. An electric field is strong in capacitively coupled portions of the two antennas, that is, in capacitively coupled portions of the second end 104A and the fourth end 204A, and the fifth end 106A and the fourth end 204A of the rear antenna, and capacitively coupled portions of the second end 104B and the fourth end 204B, and the fifth end 106B and the fourth end 204B of the front antenna. Accordingly, in a case where the capacitively coupled portions of the second end 104A and the fourth end 204A, and the fifth end 106A and the fourth end 204A of the rear antenna, and the capacitively coupled portions of the second end 104B and the fourth end 204B, and the fifth end 106B and the fourth end 204B of the front antenna face and are disposed close to each other, the capacitively coupled portions may be coupled and the antennas may not operate as antennas (the rear antenna and the front antenna) independent of each other. For this reason, it is desirable that the capacitively coupled portions of the two antennas are separated from each other. In the present embodiment, it is possible to increase a distance between the capacitively coupled portions of the respective antennas compared to a case where the two antennas are arranged in the right-left direction of the antenna device 10 for vehicle. The above-described two antennas may be arranged in a direction different from the front-rear direction of the antenna device 10 for vehicle, such as the right-left direction of the antenna device 10 for vehicle. That is, any disposition may be applied as long as the disposition is made in which the distance between the capacitively coupled portions of the respective antennas is large. For example, the respective antennas may be disposed such that the capacitively coupled portions of the second end 104A and the fourth end 204A, and the fifth end 106A and the fourth end 204A of the rear antenna are toward the rear, and the capacitively coupled portions of the second end 104B and the fourth end 204B, and the fifth end 106B and the fourth end 204B of the front antenna are toward the front.

A height of the antenna case 530 is low in a region where the front antenna having the first antenna element 100B and the second antenna element 200B are disposed. It is preferable that a height of each of the first antenna element 100B and the second antenna element 200B is high. In the present embodiment, the second end 1048 and the fifth end 1068 are positioned behind the first end 102B, and the fourth end 204B is positioned behind the third end 202B. In this case, it is possible to increase the height of the first antenna element 100B and the second antenna element 200B compared to a case where the second end 104B and the fifth end 106B are positioned ahead of the first end 102B, and the fourth end 204B is positioned ahead of the third end 202B. The second end 104B and the fifth end 106B however may be positioned ahead of the first end 1021*i*, and the fourth end 204B may be positioned ahead of the third end 202B.

Figure 14:
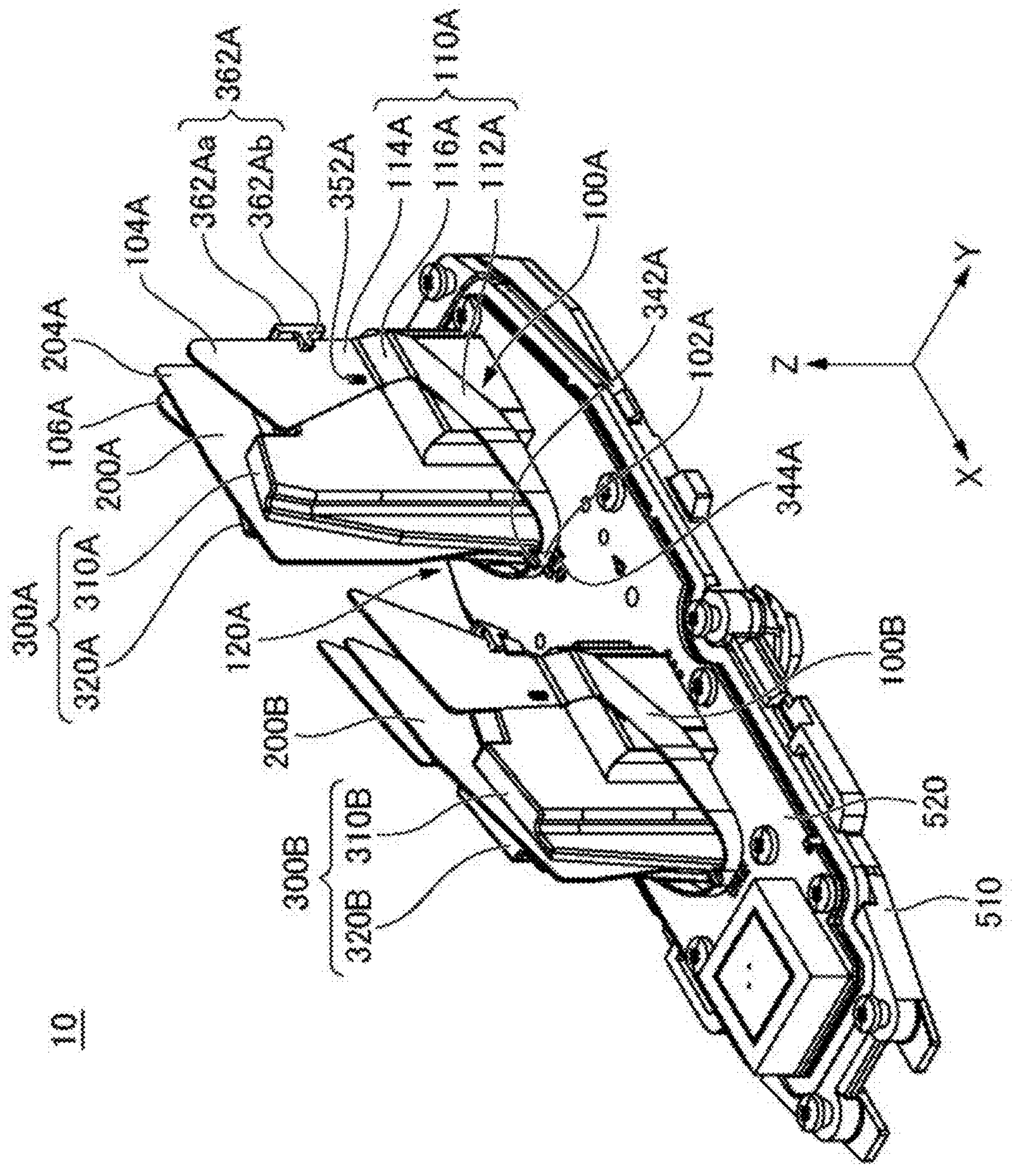
FIG. 14 is a perspective view of a second example with the antenna case removed from the whole of the antenna device for vehicle according to Embodiment 2.
Figure 15:
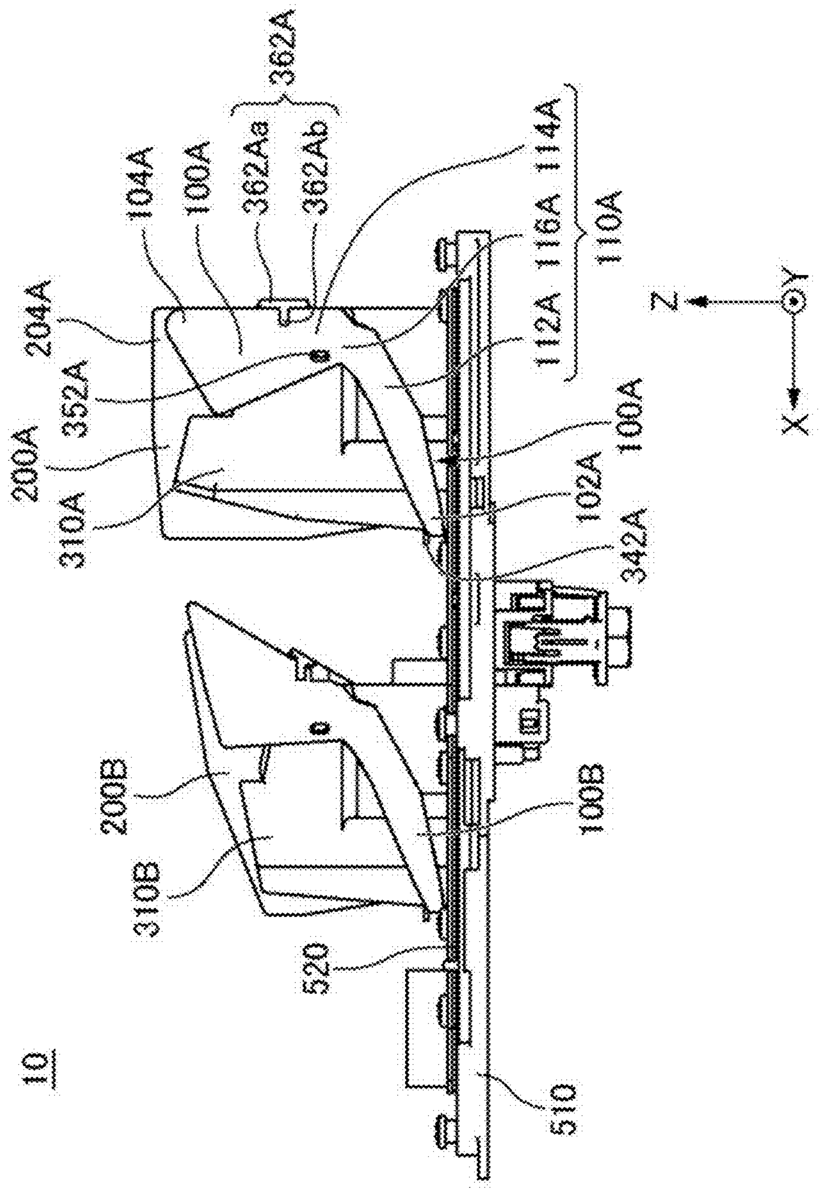
FIG. 15 is a left side view of the second example of the antenna device for vehicle shown in FIG. 14.
Figure 16:
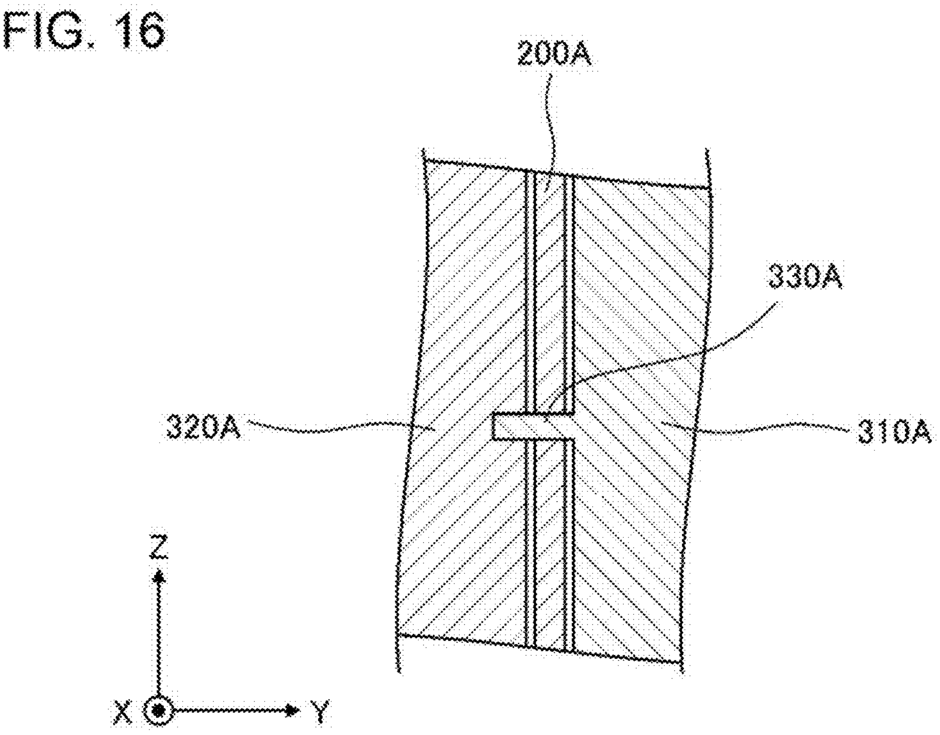
FIG. 16 is a sectional view illustrating an example of mechanical joining of a first block and a second block shown in FIG. 14.

FIG. 14 is a perspective view of a second example with the antenna case removed from the whole of the antenna device 10 for vehicle according to Embodiment 2. FIG. 15 is a left side view of the second example of the antenna device 10 for vehicle shown in FIG. 14. FIG. 16 is a sectional view illustrating an example of mechanical joining of a first block 310A and a second block 320A shown in FIG. 14. The antenna device 10 for vehicle according to the second example shown in FIGS. 14 to 16 is the same as the antenna device 10 for vehicle according to the first example shown in FIGS. 11 to 13, except for the following points.

A corner of at least a portion of the first antenna element 100A is rounded. Specifically, as shown in FIGS. 14 and 15, a corner between an upper end edge and a rear end edge of the second end 104A, that is, a corner of a portion of the first antenna element 100A capacitively coupled to at least a portion of the second antenna element 200A is rounded. In this case, it is possible to suppress the occurrence of a defect, such as damage to a worker in assembling the antenna device 10 for vehicle due to the corner or damage to other members due to the corner compared to a case where the corner is sharp. A corner different from the corner between the upper end edge and the rear end edge of the second end 104A, such as a corner between an upper end edge and a front end edge of the second end 104A may also be rounded.

As shown in FIG. 14, in the same manner as the corner between the upper end edge and the rear end edge of the second end 104A, a corner of at least a portion of the first antenna element 100A, such as a corner between an upper end edge and a rear end edge of the fifth end 106A is rounded.

As shown in FIGS. 14 and 15, in the same manner as the corner between the upper end edge and the rear end edge of the second end 104A, a corner of at least a portion of the second antenna element 200A, such as a corner between an upper end edge and a rear end edge of the fourth end 204A is also rounded.

In the example shown in FIGS. 14 and 15, the front first antenna element 100B and the front second antenna element 200B also have the same configuration as the configuration of the rear first antenna element. 100A and the second antenna element 200A described above.

The antenna device 10 for vehicle includes a holder 300A provided in the rear antenna having the first antenna element 100A and the second antenna element 200A. The holder 300A is positioned between at least a portion of the first antenna element 100A and at least a portion of the second antenna element 200A. At least a portion in the first antenna element 100A and the second antenna element 200A is supported by the holder 300A. In this case, it is possible to suppress an influence of vibration of an automobile on which the antenna device 10 for vehicle is mounted, on mechanical characteristics of at least one of the first antenna element 100A and the second antenna element 200A compared to a case where the holder 300A is not provided. Fluctuation of a distance between the second end 104A and the fourth end 204A in the second direction Y or fluctuation of a superimposed area of the second end 104A and the fourth end 204A in the second direction Y due to vibration of the automobile in which the antenna device 10 for vehicle is mounted is suppressed, and it is possible to suppress fluctuation of capacitance between the second end 104A and the fourth end 204A, compared to a case where the holder 300A is not provided. In the same manner, fluctuation of a distance between the fifth end 106A and the fourth end 204A in the second direction Y or fluctuation of a superimposed area of the fifth end 106A and the fourth end 204A in the second direction Y due to vibration of the automobile in which the antenna device 10 for vehicle is mounted is suppressed, and it is possible to suppress fluctuation of capacitance between the fifth end 106A and the fourth end 204A, compared to a case where the holder 300A is not provided.

As shown in FIG. 14, the holder 300A has the first block 310A and the second block 320A. The first block 310A and the second block 320A are, for example, resin blocks. The first block 310A is positioned between the second antenna element 200A and a first region 110A of the first antenna element 100A. The second block 320A is positioned between the second antenna element 200A and a second region 120A of the first antenna element 100A.

As shown in FIG. 16, a projection portion 330A is provided on a surface of the first block 310A on the negative direction side of the second direction Y. The projection portion 330A passes through a hole provided in the second antenna element 200A in the second direction Y. The projection portion 330A is mechanically joined to, such as fitted into a recess portion provided in a surface of the second block 320A on the positive direction side of the second direction Y. In this manner, the first block 310A, the second block 320A, and the second antenna element 200A are integrated. In this case, it becomes easy to integrally assemble the first block 310A, the second block 320A, and the second antenna element 200A compared to a case where the first block 310A and the second block 320A are mechanically spaced apart from each other without being mechanically joined through the projection portion 330A. Fluctuation of the distance between the second end 104A and the fourth end 204A in the second direction Y or fluctuation of the superimposed area of the second end 104A and the fourth end 204A in the second direction Y due to vibration of the automobile in which the antenna device 10 for vehicle is mounted is suppressed, and it is possible to suppress fluctuation of capacitance between the second end 104A and the fourth end 204A, compared to a case where the first block 310A and the second block 320A are mechanically spaced apart from each other without being mechanically joined through the projection portion 330A. In the same manner, fluctuation of the distance between the fifth end 106A and the fourth end 204A in the second direction Y or fluctuation of the superimposed area of the fifth end 106A and the fourth end 204A in the second direction Y due to vibration of the automobile in which the antenna device 10 for vehicle is mounted is suppressed, and it is possible to suppress fluctuation of capacitance between the fifth end 106A and the fourth end 204A, compared to a case where the first block 310A and the second block 320A are mechanically spaced apart from each other without being mechanically joined through the projection portion 330A. The first block 310A and the second block 320A may not be mechanically joined through the projection portion 330A and may be mechanically spaced from each other.

In the example shown in FIG. 16, the projection portion 330A provided in the first block 310A is mechanically joined to the recess portion provided in the second block 320A. The projection portion 330A however may be provided in the second block 320A. In this case, the projection portion 330A provided in the second block 320A is mechanically joined to the recess portion provided in the first block 310A.

As shown in FIG. 14, a surface of the first block 310A on the positive direction side of the second direction Y is in a shape along unevenness of the first portion 112A, the first step portion 116A, and the second portion 114A of the first region 110A. In this case, it is possible to suppress vibration of the first region 110A due to vibration at the time of traveling of the automobile on which the antenna device 10 for vehicle is mounted, compared to a case where the surface of the first block 310A on the positive direction side of the second direction Y is not in a shape along unevenness of the first portion 112A, the first step portion 116A, and the second portion 114A, for example when a gap is formed between the surface of the first block 310A on the positive direction side of the second direction Y and the first portion 112A, the first step portion 116A, and the second portion 114A. Fluctuation of the distance between the second end 104A and the fourth end 204A in the second direction Y or fluctuation of the superimposed area of the second end 104A and the fourth end 204A in the second direction Y due to vibration of the automobile on which the antenna device 10 for vehicle is mounted is suppressed, and it is possible to suppress fluctuation of capacitance between the second end 104A and the fourth end 204A, compared to a case where the surface of the first block 310A on the positive direction side of the second direction Y is not in a shape along unevenness of the first portion 112A, the first step portion 116A, and the second portion 114A.

In the same manner as the surface of the first block 310A on the positive direction side of the second direction Y, a surface of the second block 320A on the negative direction side of the second direction Y may also be in a shape along unevenness of the second region 120A.

As shown in FIGS. 14 and 15, a first protrusion 342A and a second protrusion 344A are provided in an end portion on the positive direction side of the first direction X of at least one of the first block 310A and the second block 320A. The first protrusion 342A is positioned on the positive direction side of the third direction Z with respect to the first end 102A of the first antenna element 100A. The second protrusion 344A is positioned on the negative direction side of the third direction Z with respect to the first end 102A of the first antenna element 100A. The first end 102A is pressed in the third direction Z by the first protrusion 342A and the second protrusion 344A. For this reason, it becomes easy to position and fix the first end 102A in the third direction Z compared to a case where the first protrusion 342A and the second protrusion 344A are not provided. The first protrusion 342A and the second protrusion 344A may not be provided.

As shown in FIGS. 14 and 15, a third protrusion 352A caught in a hole provided in the second portion 114A is provided on the positive direction side of the second direction Y of the first block 310A. The third protrusion 352A is mechanically joined to the hole provided in the second portion 114A by, for example, snap-fit. In a case where the third protrusion 352A is provided, it becomes easy to position the first block 310A and the second portion 114A compared to a case where the third protrusion 352A is not provided. A configuration in which the third protrusion 352A of the holder 300A is caught in the hole provided in the second portion 114A of the first antenna element 100A functions as fixing means of the first antenna element 100A and the holder 300A. The third protrusion 352A may be caught in a hole provided in a portion of the first region 110A different from the second portion 114A instead of the hole provided in the second portion 114A. A plurality of third protrusions 352A may be provided on the positive direction side of the second direction Y of the first block 310A. In this case, a plurality of third protrusions 352A can be caught in a plurality of holes provided in at least a portion of the first portion 112A, the first step portion 116A, and the second portion 114A.

In the same manner as the third protrusion 352A provided in the first block 310A, a protrusion caught in a hole provided in the second region 120A may be provided also on the negative direction side of the second direction Y of the second block 320A.

As shown in FIGS. 14 and 15, a support portion 362A supporting the first region 110A is provided on the negative direction side of the first direction X of the first block 310A. The support portion 362A includes a first support 362Aa and a second support 362Ab.

The first support 362Aa is positioned on the negative direction side of the first direction X with respect to at least a portion of an end of the second portion 114A on the negative direction side of the first direction X. For this reason, the first support 362Aa can support the second portion 114A from the negative direction side of the first direction X. In a case where the first support 362Aa is provided, it becomes easy to position the first region 110A in the first direction X compared to a case where the first support. 362Aa is not provided. In a case where the first support 362Aa is provided, it is possible to suppress an influence of vibration at the time of traveling of the automobile on which the antenna device 10 for vehicle is mounted, on the mechanical characteristics of the first region 110A compared to a case where first support 362Aa is not provided. In a case where the first support 362Aa is provided, fluctuation of the superimposed area of the second end 104A and the fourth end 204A in the second direction Y due to vibration of the automobile on which the antenna device 10 for vehicle is mounted is suppressed, and it is possible to suppress fluctuation of capacitance between the second end 104A and the fourth end 204A, compared to a case where the first support 362Aa is not provided.

The second support 362Ab is positioned on the positive direction side of the second direction Y with respect to at least a portion of the surface of the second portion 114A on the positive direction side of the second direction Y. For this reason, the second support 362Ah can support the second portion 114A from the positive direction side of the second direction Y. In a case where the second support 362Ab is provided, it is possible to suppress deflection of the first region 110A in the second direction Y compared to a case where the second support 362Ab is not provided. In a case where the second support 362Ab is provided, it is possible to suppress an influence of vibration at the time of traveling of the automobile on which the antenna device 10 for vehicle is mounted, on the mechanical characteristics of the first region 110A compared to a case where the second support 362Ab is not provided. In a case where the second support 362Ab is provided, fluctuation of the distance between the second end 104A and the fourth end 204A in the second direction Y due to vibration of the automobile on which the antenna device 10 for vehicle is mounted is suppressed, and it is possible to suppress fluctuation of capacitance between the second end 104A and the fourth end 204A, compared to a case where the second support 362Ab is not provided.

In the same manner as the support portion 362A provided in the first block 310A, a support portion supporting the second region 120A may be provided also on the negative direction side of the first direction X of the second block 320A.

A structure of the holder 300A is not limited to the example shown in FIGS. 14 to 16. For example, the holder 300A may have only one of the first block 310A and the second block 320A. In a case where the first antenna element 100A has only the first region 110A, for example, like the first antenna element 100 shown in FIGS. 1 and 2, or 5 described above or FIG. 19 or 22 described below, the holder 300A may have only the first block 310A positioned between the second antenna element 200A and the first region 110A.

The antenna device 10 for vehicle further includes a holder 300B provided in the front antenna having the first antenna element 100B and the second antenna element 200B. In the example shown in FIGS. 14 and 15, the front holder 300B has the same configuration as the configuration of the rear holder 300A described above. A height of a first block 310B and a second block 320B of the front holder 300B in the third direction Z is lower than the height of the first block 310A and the second block 320A of the rear holder 300A in the third direction Z according to the shape of the antenna case (not shown).

Figure 17:
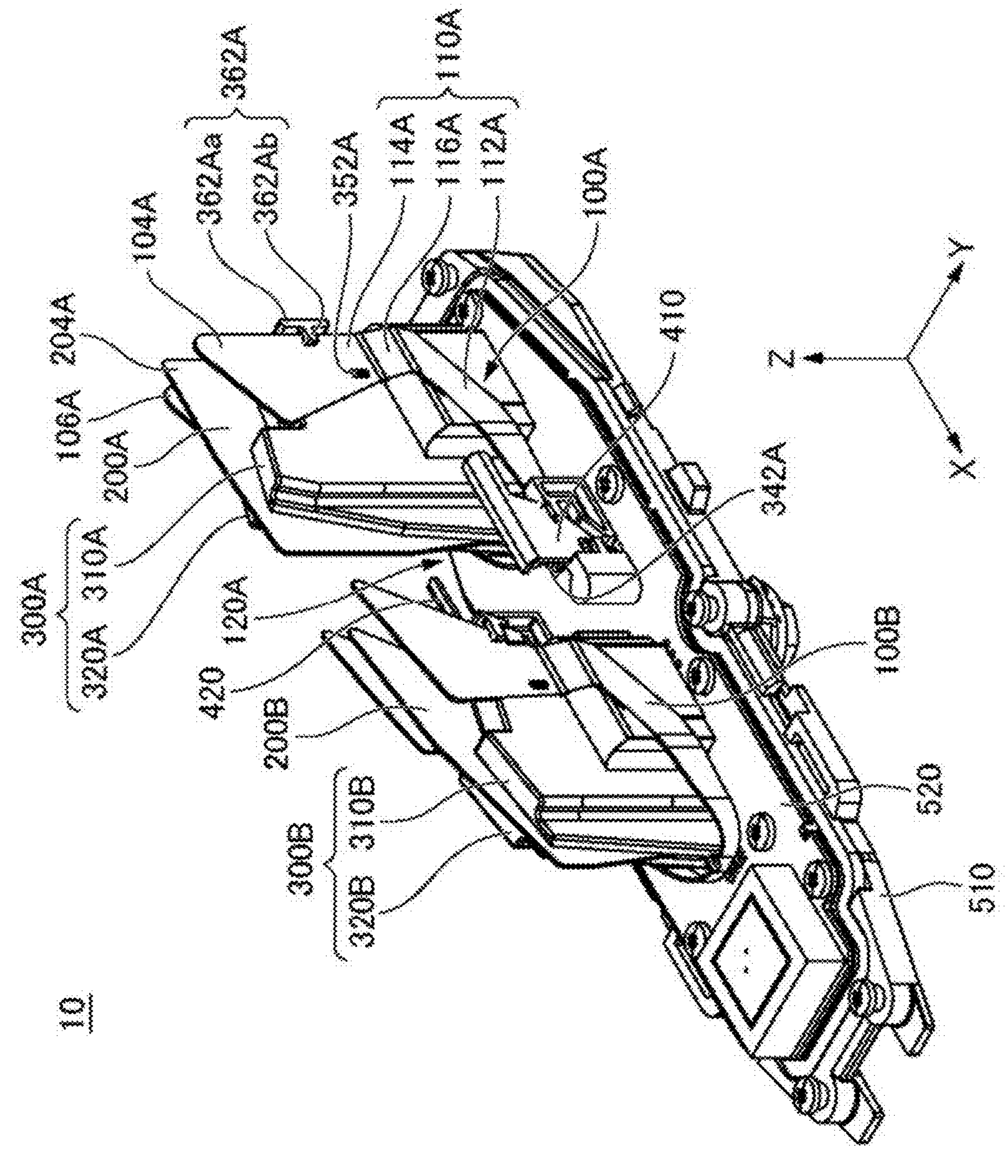
FIG. 17 is a perspective view of a third example with the antenna case removed from the whole of the antenna device for vehicle according to Embodiment 2.
Figure 18:
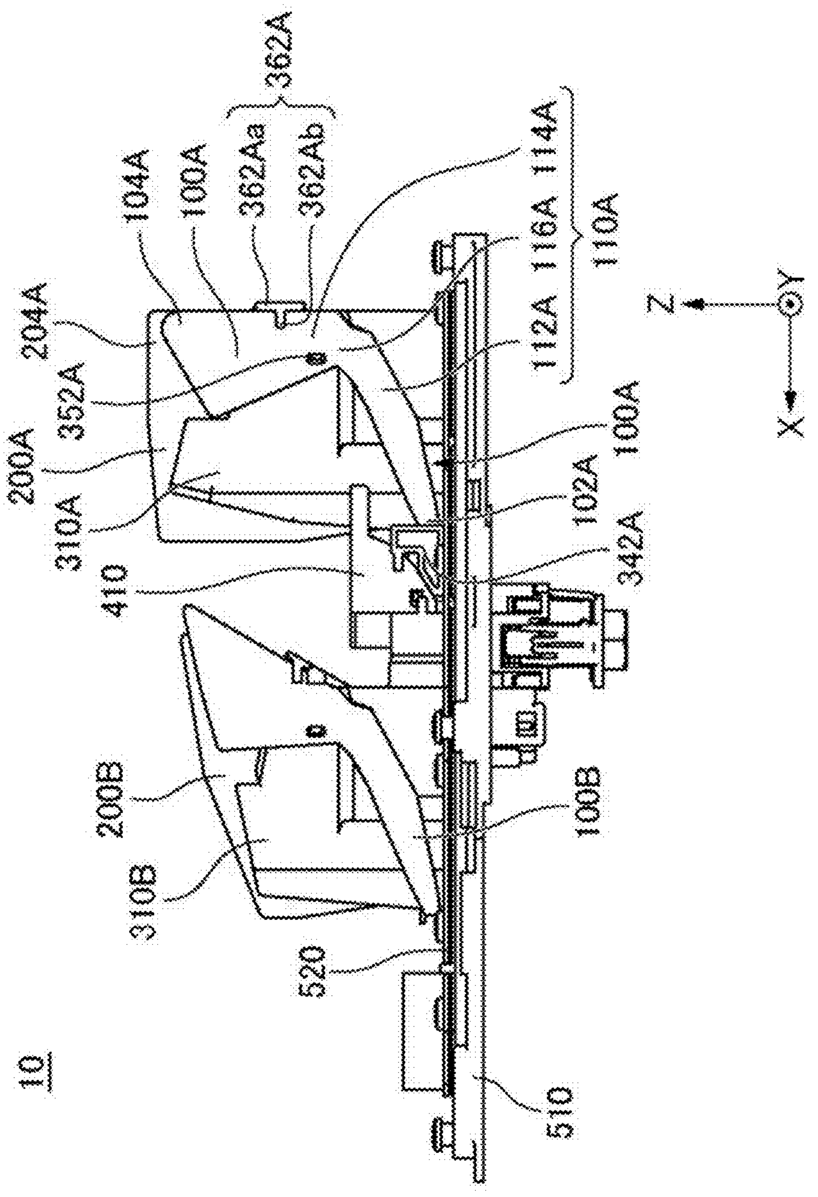
FIG. 18 is a left side view of the third example of the antenna device for vehicle shown in FIG. 17.

FIG. 17 is a perspective view of a third example with the antenna case removed from the whole of the antenna device 10 for vehicle according to Embodiment 2. FIG. 18 is a left side view of the third example of the antenna device 10 for vehicle shown in FIG. 17. The antenna device 10 for vehicle according to the third example shown in FIGS. 17 and 18 is the same as the antenna device 10 for vehicle according to the second example shown in FIGS. 14 to 16, except for the following points.

The antenna device 10 for vehicle further includes a first antenna portion 410 and a second antenna portion 420. The first antenna portion 410 and the second antenna portion 420 are positioned between the rear antenna having the first antenna element 100A and the second antenna element 200A and the front antenna having the first antenna element 100E and the second antenna element 200B in the first direction X. The first antenna portion 410 is positioned on the positive direction side of the second direction Y with respect to a virtual line passing through the rear second antenna element 200A and the front second antenna element 200B in parallel to the first direction X. The second antenna portion 420 is positioned on the negative direction side of the second direction Y with respect to a virtual line passing through the rear second antenna element 200A and the front second antenna element 200B in parallel to the first direction X.

The first antenna portion 410 and the second antenna portion 420 are, for example, LTE antennas, Wi-Fi (Registered Trademark) antennas, or Multiple-input and Multiple-Output (MIMO) antennas. The first antenna portion 410 and the second antenna portion 420 may be antennas of the same type or may be antennas of different types.

As described referring to FIGS. 11 to 13, the rear antenna having the first antenna element 100A and the second antenna element 200A and the front antenna having the first antenna element 100B and the second antenna element 200B are disposed with an appropriate space in the first direction X such that both antennas function as antennas independent of each other. The first antenna portion 410 and the second antenna portion 420 are disposed in the space. Accordingly, it is possible to efficiently utilize a space in the antenna case to dispose the first antenna portion 410 and the second antenna portion 420, compared to a case where the first antenna portion 410 and the second antenna portion 420 are disposed in a region different from the space.

The disposition of the first antenna portion 410 and the second antenna portion 420 is not limited to the example shown in FIGS. 17 and 18. For example, the first antenna portion 410 and the second antenna portion 420 may be arranged in the first direction X. One of the first antenna portion 410 and the second antenna portion 420 may not be provided. At least one another antenna portion may be provided in addition to the first antenna portion 410 and the second antenna portion 420.

Embodiment 3

Figure 19:
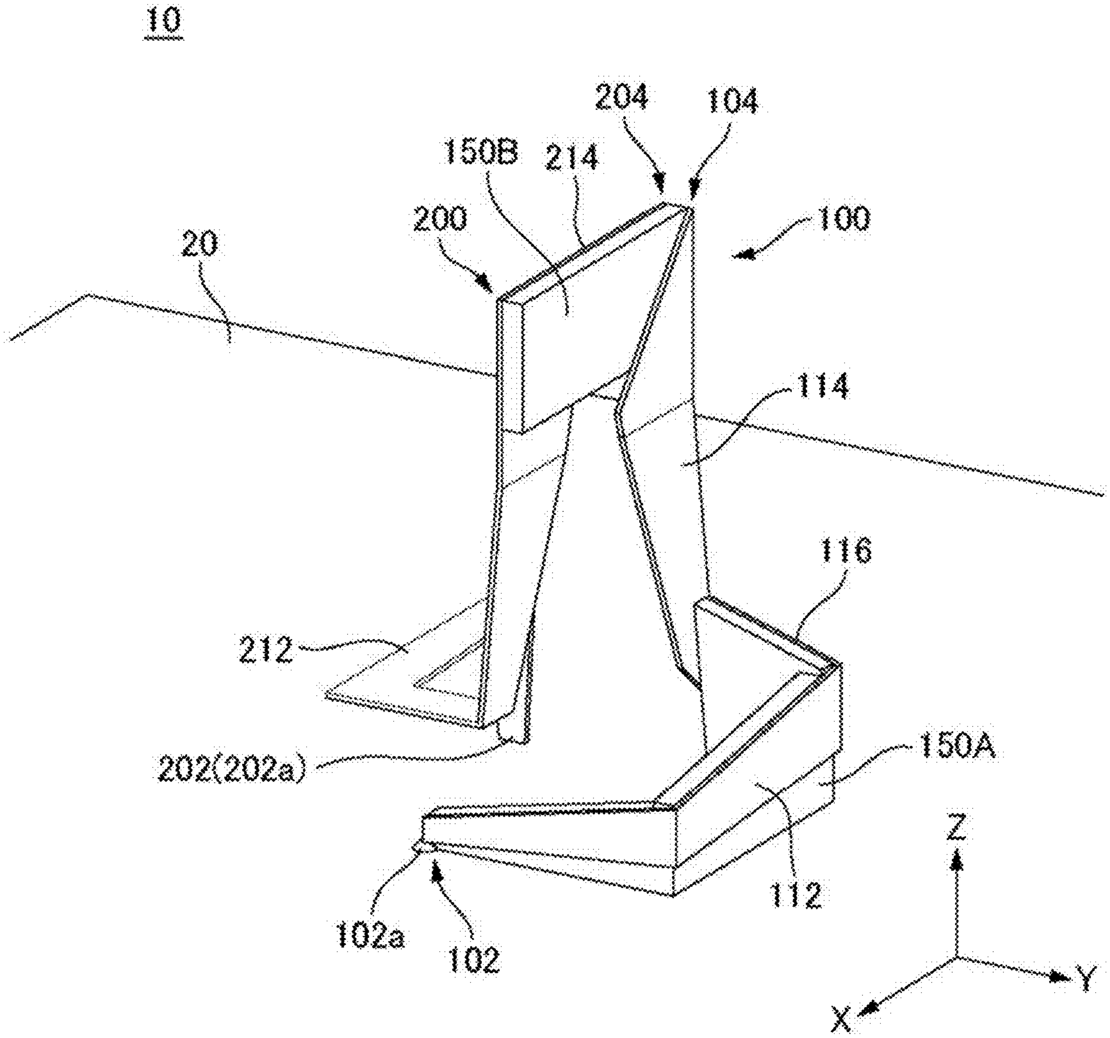
FIG. 19 is a perspective view of an antenna device for vehicle according to Embodiment 3.

FIG. 19 is a perspective view of an antenna device 10 for vehicle according to Embodiment 3. The antenna device 10 for vehicle according to Embodiment 3 is the same as the antenna device 10 for vehicle according to Embodiment 1, except for the following points.

The third portion 212 of the second antenna element 200 includes, from the third end 202 to the fourth portion 214, not only a portion extending from the third end 202 to the fourth portion 214 toward the positive direction side of the third direction Z, but also a portion extending from the third end 202 to the fourth portion 214 in another direction. Specifically, the third portion 212 includes, from the third end 202 to the fourth portion 214, a portion extending toward the positive direction side of the third direction Z, a portion extending toward the positive direction side of the first direction X, a portion extending toward the positive direction side of the second direction Y, and a portion extending toward the positive direction side of the third direction Z, in order. In this case, it is possible to maintain the total length between the third end 202 and the fourth end 204 of the second antenna element 200 while reducing the length of the second antenna element 200 in the first direction X compared to a case where the third portion 212 includes only a portion extending from the third end 202 to the fourth portion 214 toward the positive direction side of the third direction Z, for example, as shown in FIG. 1.

The antenna device 10 for vehicle further includes a first dielectric 150A and a second dielectric 150B. The first dielectric 150A is attached to at least a portion of the first antenna element 100. Specifically, the first dielectric 150A is attached to an inside surface of the first portion 112 of the first antenna element 100. The dielectric 150 may be attached to at least one of the inside surface of the first portion 112 and an outside surface of the first portion 112. The second dielectric 150B is provided over at least a portion of the first antenna element 100 and at least a portion of the second antenna element 200. Specifically, the second dielectric 150B is provided over at least a portion of the second end 104 of the first antenna element 100 and at least a portion of the fourth end 204 of the second antenna element 200.

In the present embodiment, the second end 104 of the first antenna element 100 and the fourth end 204 of the second antenna element 200 do not overlap in the second direction Y. Even in this case, since the second end 104 of the first antenna element 100 and the fourth end 204 of the second antenna element 200 are close to each other, the second end 104 and the fourth end 204 are capacitively coupled to each other. The second end 104 of the first antenna element 100 and the fourth end 204 of the second antenna element 200 do not overlap in the second direction Y, whereby a capacitive coupling between the second end 104 of the first antenna element 100 and the fourth end 204 of the second antenna element 200 can be adjusted to be smaller than a capacitive coupling in a case where the second end 104 of the first antenna element 100 and the fourth end 204 of the second antenna element 200 overlap in the second direction Y.

In the present embodiment, for example, as shown in FIGS. 11 to 13, in a case where the antenna having the first antenna element 100A and the second antenna element 200A and the antenna having the first antenna element 100B and the second antenna element 200B are arranged in the front-rear direction of the antenna device 10 for vehicle, it is possible to reduce the length of each antenna in the front-rear direction, for example, compared to the antenna having the first antenna element 100 and the second antenna element 200 according to Embodiment 1. Accordingly, it is possible to further secure the isolation of the above-described two antennas, for example, compared to the antenna having the first antenna element 100 and the second antenna element 200 according to Embodiment 1. An antenna of another medium may be disposed between the above-described two antennas.

Figure 20:
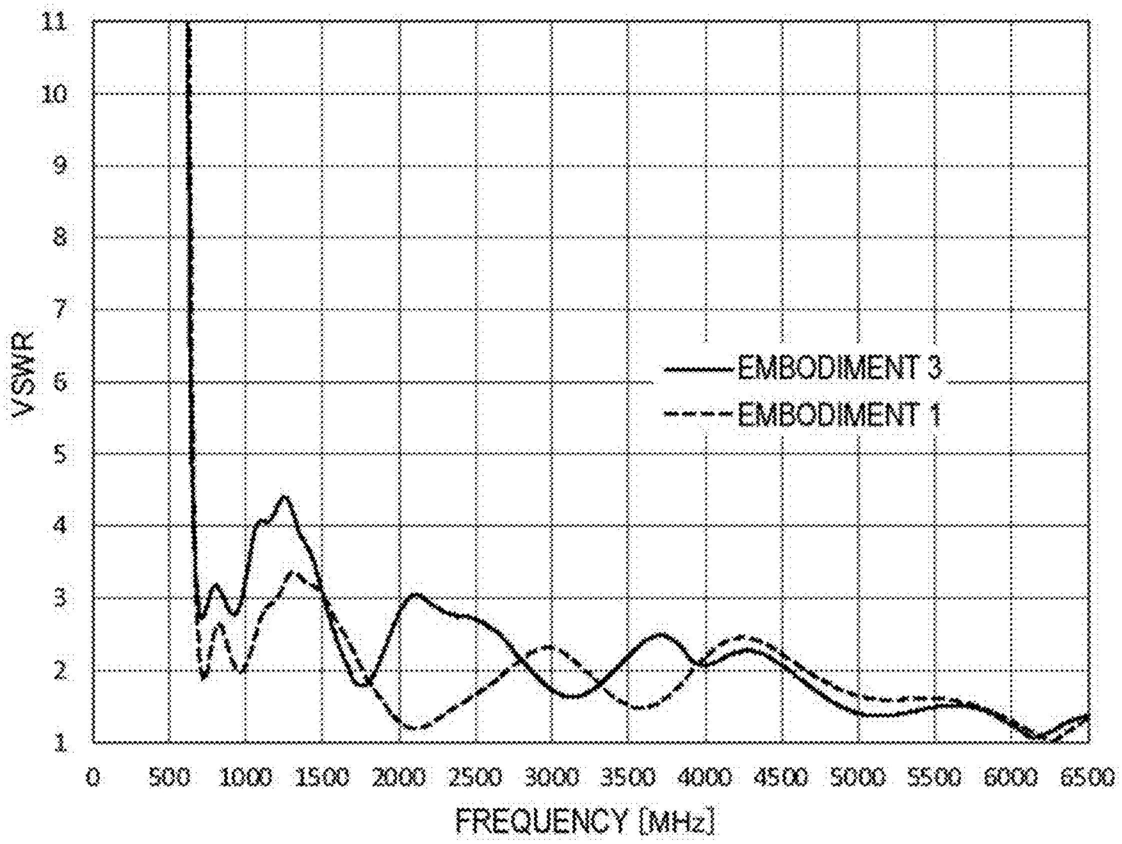
FIG. 20 is a graph showing VSWR characteristics of the antenna device for vehicle according to Embodiment 3 and the antenna device for vehicle according to Embodiment 1.
Figure 21:
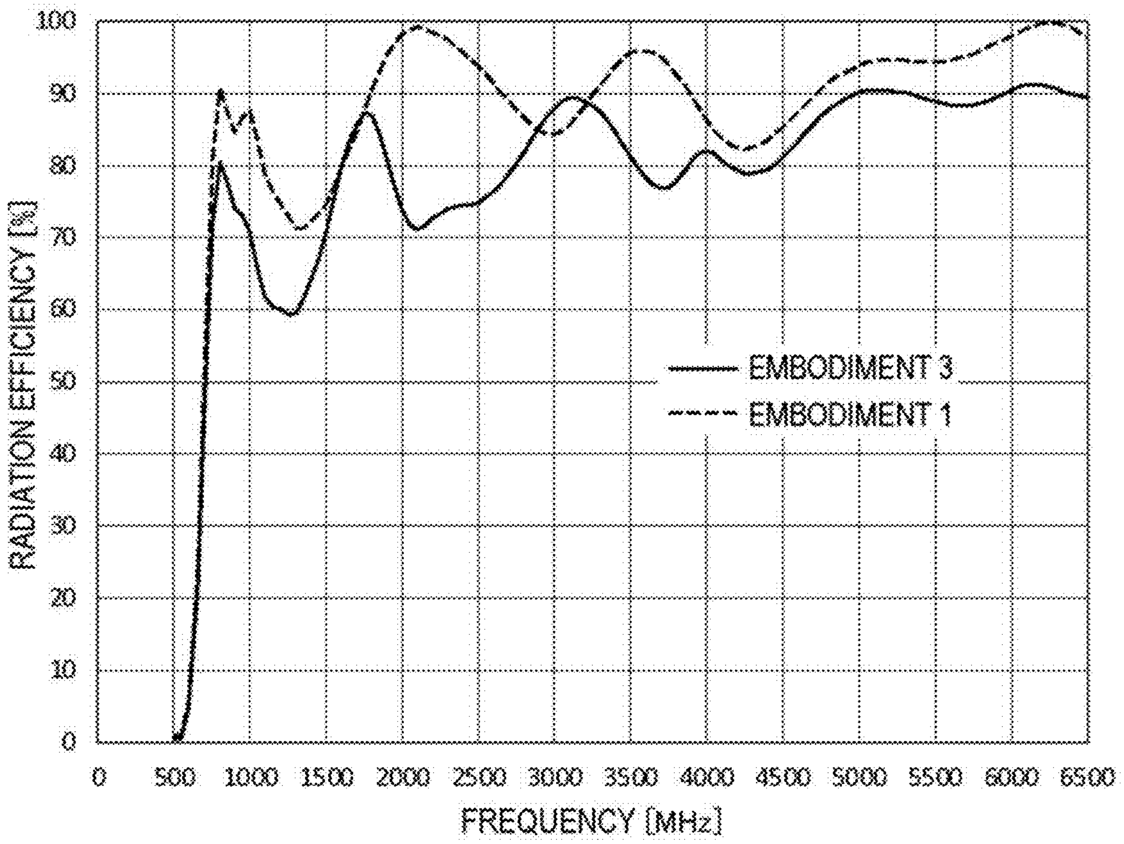
FIG. 21 is a graph showing radiation efficiency characteristics of the antenna device for vehicle according to Embodiment 3 and the antenna device for vehicle according to Embodiment 1.

FIG. 20 is a graph showing VSWR characteristics of the antenna device 10 for vehicle according to Embodiment 3 and the antenna device 10 for vehicle according to Embodiment 1. FIG. 21 is a graph showing radiation efficiency characteristics of the antenna device 10 for vehicle according to Embodiment 3 and the antenna device 10 for vehicle according to Embodiment 1.

A horizontal axis of the graph of FIG. 20 indicates a frequency. A vertical axis of the graph of FIG. 20 indicates a VSWR. A solid line in the graph of FIG. 20 indicates the VSWR characteristic of the antenna device 10 for vehicle according to Embodiment 3. A broken line in the graph of FIG. 20 indicates the VSWR characteristic of the antenna device 10 for vehicle according to Embodiment 1.

A horizontal axis of the graph of FIG. 21 indicates a frequency. A vertical axis of the graph of FIG. 21 indicates radiation efficiency. A solid line in the graph of FIG. 21 indicates the radiation efficiency characteristic of the antenna device 10 for vehicle according to Embodiment 3. A broken line in the graph of FIG. 21 indicates the radiation efficiency characteristic of the antenna device 10 for vehicle according LO Embodiment 1.

As shown in FIG. 20, the VSWR of each of Embodiment 3 and Embodiment 1 is as low as less than 3.5 over a broadband of 700 MHz to 1000 MHz and 1500 MHz to 6500 MHz. As shown in FIG. 21, the radiation efficiency of each of Embodiment 3 and Embodiment 1 is as high as greater than 60% over a broadband of 700 MHz to 6500 MHz, except for near 1250 MHz of Embodiment 3.

Embodiment 4

Figure 22:
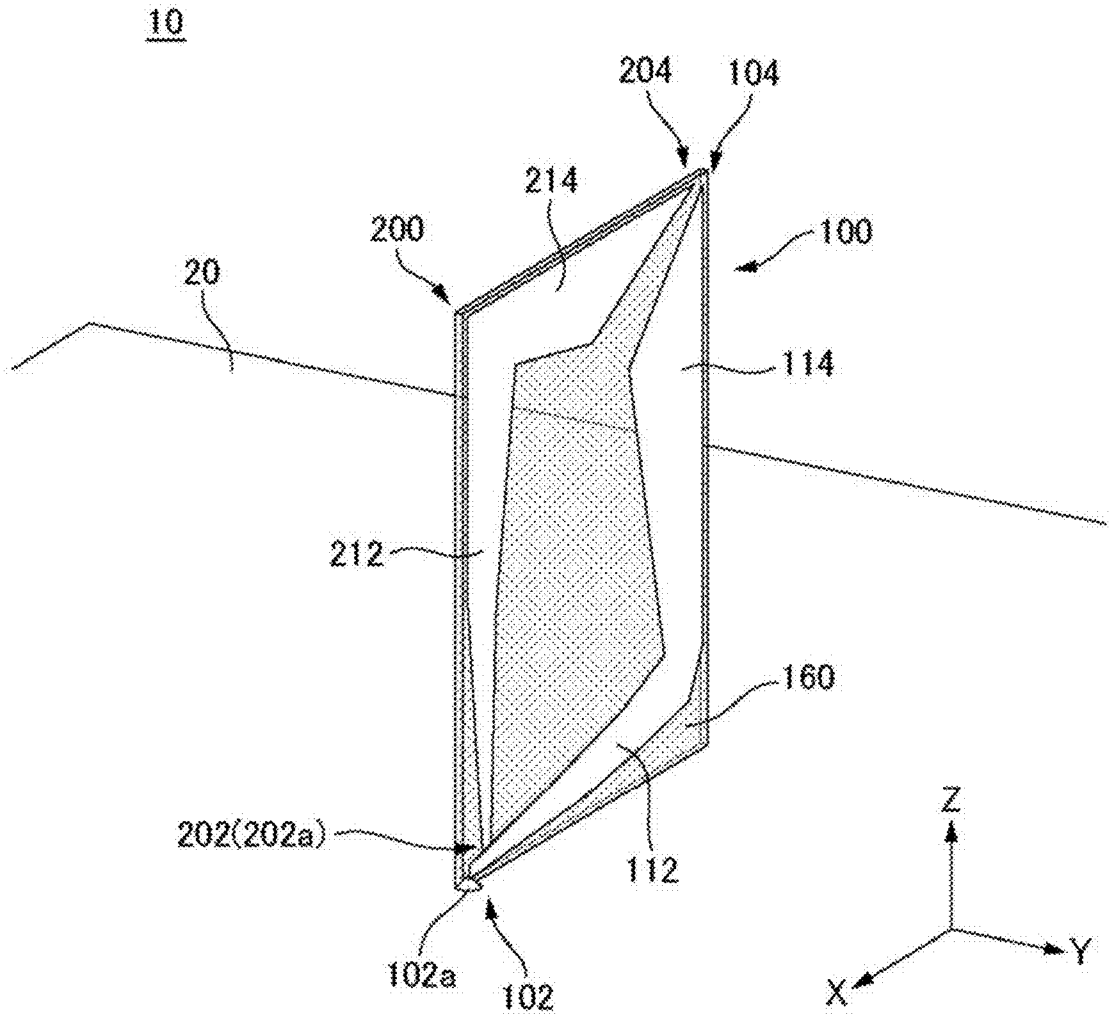
FIG. 22 is a perspective view of an antenna device for vehicle according to Embodiment 4.

FIG. 22 is a perspective view of an antenna device 10 for vehicle according to Embodiment 4. The antenna device 10 for vehicle according to Embodiment 4 is the same as the antenna device 10 for vehicle according to Embodiment 1, except for the following point.

The antenna device 10 for vehicle includes a substrate 160, such as a printed circuit board (PCB). A first antenna element 100 is a conductive pattern formed on a surface of the substrate 160 on the positive direction side of the second direction Y. A second antenna element 200 is a conductive pattern formed on a surface of the substrate 160 on the negative direction side of the second direction Y. In the present embodiment, a second end 104 of the first antenna element 100 and a fourth end 204 of the second antenna element 200 do not overlap in a thickness direction of the substrate 160, that is, in the second direction Y. Even in this case, since the second end 104 of the first antenna element 100 and the fourth end 204 of the second antenna element 200 are close to each other, the second end 104 and the fourth end 204 are capacitively coupled to each other. The second end 104 of the first antenna element 100 and the fourth end 204 of the second antenna element 200 do not overlap in the second direction Y, whereby a capacitive coupling between the second end 104 of the first antenna element 100 and the fourth end 204 of the second antenna element 200 can be adjusted to be smaller than a capacitive coupling in a case where the second end 104 of the first antenna element 100 and the fourth end 204 of the second antenna element 200 overlap in the second direction Y.

Figure 23:
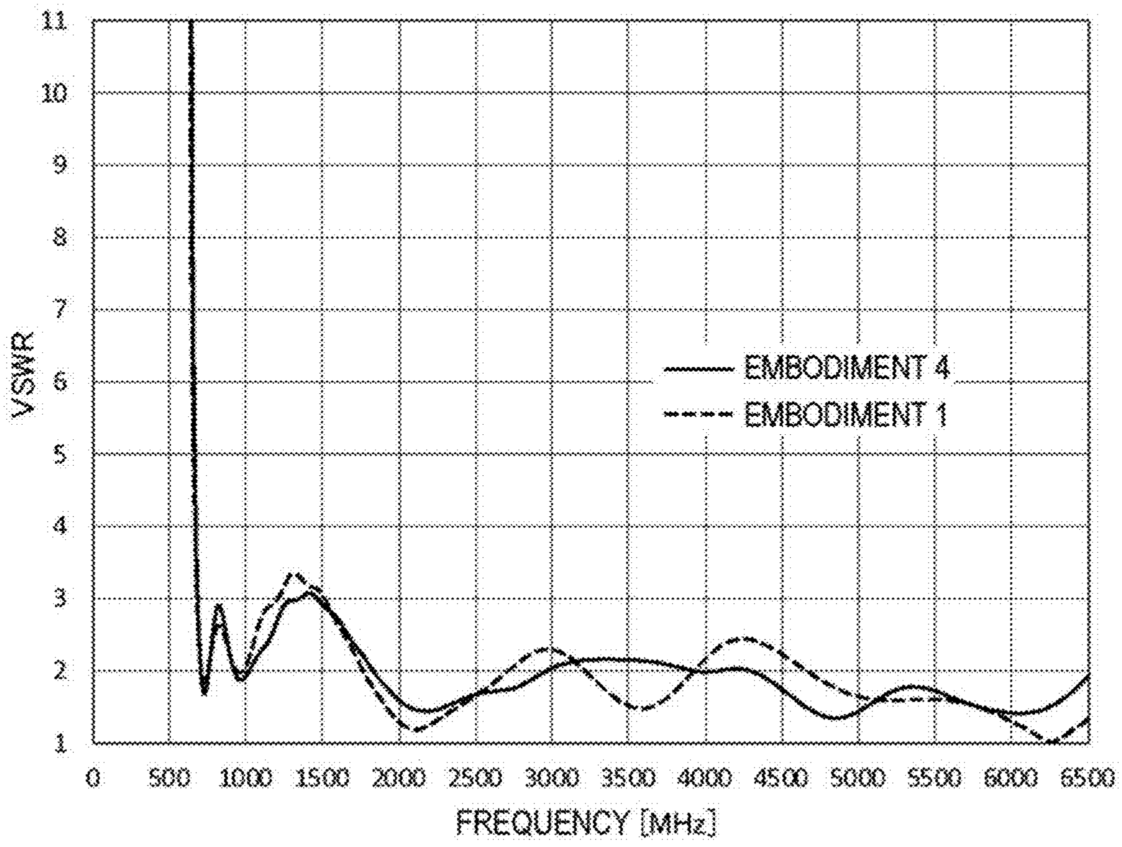
FIG. 23 is a graph showing VSWR characteristics of the antenna device for vehicle according to Embodiment 4 and the antenna device for vehicle according to Embodiment 1.
Figure 24:
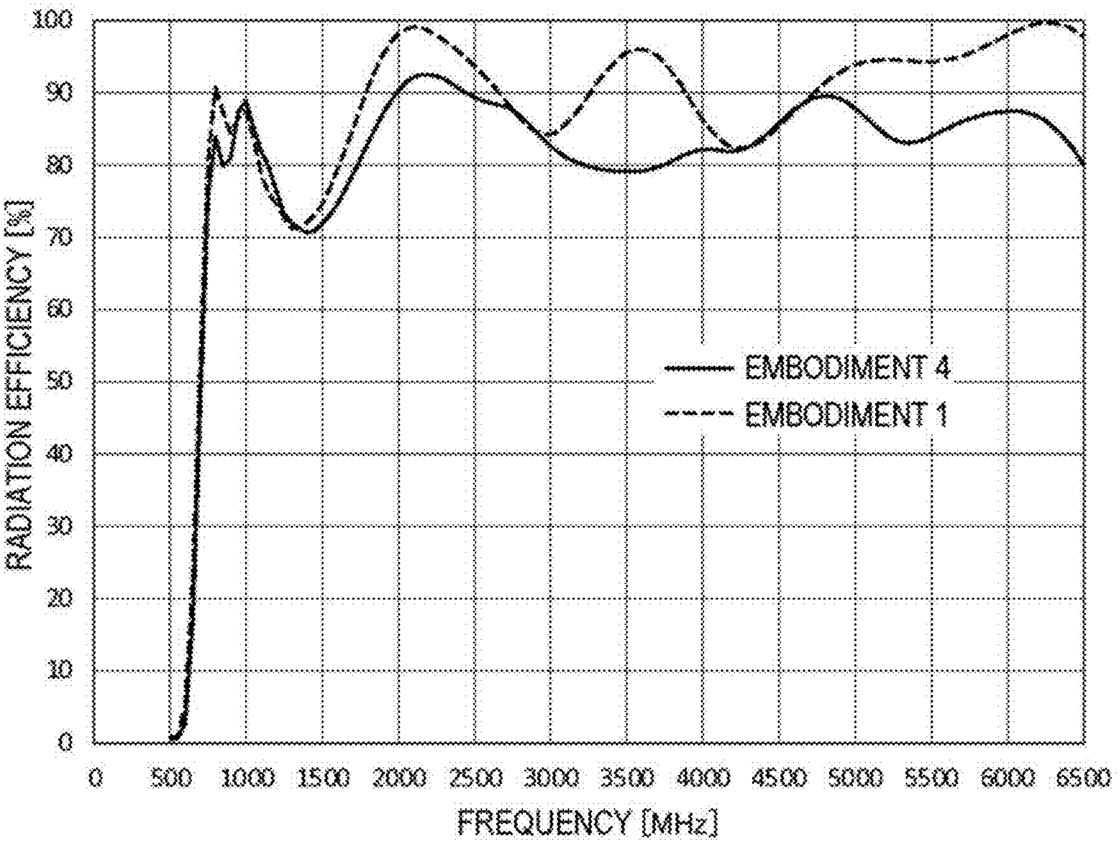
FIG. 24 is a graph showing radiation efficiency characteristics of the antenna device for vehicle according to Embodiment 4 and the antenna device for vehicle according to Embodiment 1.

FIG. 23 is a graph showing VSWR characteristics of the antenna device 10 for vehicle according to Embodiment 4 and the antenna device 10 for vehicle according to Embodiment 1. FIG. 24 is a graph showing radiation efficiency characteristics of the antenna device 10 for vehicle according to Embodiment 4 and the antenna device 10 for vehicle according to Embodiment 1.

A horizontal axis of the graph of FIG. 23 indicates a frequency. A vertical axis of the graph of FIG. 23 indicates a VSWR. A solid line in the graph of FIG. 23 indicates the VSWR characteristic of the antenna device 10 for vehicle according to Embodiment 4. A broken line in the graph of FIG. 23 indicates the VSWR characteristic of the antenna device 10 for vehicle according to Embodiment 1.

A horizontal axis of the graph of FIG. 24 indicates a frequency. A vertical axis of the graph of FIG. 24 indicates radiation efficiency. A solid line in the graph of FIG. 24 indicates the radiation efficiency characteristic of the antenna device 10 for vehicle according to Embodiment 4. A broken line in the graph of FIG. 24 indicates the radiation efficiency characteristic of the antenna device 10 for vehicle according to Embodiment 1.

As shown in FIG. 23, the VSWR of each of Embodiment 4 and Embodiment 1 is as low as less than 3.5 over a broadband of 700 MHz to 6500 MHz. As shown in FIG. 24, the radiation efficiency of each of the Embodiment 4 and Embodiment 1 is as high as greater than 60% over a broadband of 700 MHz to 6500 MHz.

In Embodiment 4, since a configuration is made in which the first antenna element 100 and the second antenna element 200 are provided using the conductive patterns on the substrate 160, it is possible to restrain collision of the antenna elements due to vibration of a vehicle, to restrain change in interval between the antenna elements due to vibration of the vehicle or assembling work, and to stably uniformize capacitive coupling, compared to a case where the antenna elements are configured with sheet metal.

Although the embodiment and the modification examples of the present invention have been described referring to the drawings, these are examples of the present invention, and various configurations other than the embodiment and the modification examples may also be employed.

For example, in each embodiment and each modification example, the second end 104 of the first antenna element 100 has the upper end edge inclined obliquely with respect to the ground 20. The upper end edge of the second end 104 of the first antenna element 100 however may have, for example, a triangular shape, a quadrangular shape, a semi-circular shape, or a semi-elliptical shape. The same also applies to the first antenna element 100A, the first antenna element 100B, the second antenna element 200A, and the second antenna element 200B described referring to FIGS. 11 to 18.

In each embodiment and each modification example, the first antenna element 100 has the feeding portion 102*a*, and the second antenna element 200 has the short-circuit portion 202*a*. The first antenna element 100 however may have the short-circuit portion 202*a*, and the second antenna element 200 may have the feeding portion 102*a*. The same also applies to the first antenna element 100A, the first antenna element 100B, the second antenna element 200A, and the second antenna element 200B described referring to FIGS. 11 to 18.

According to the specification, the following aspects are provided.

(Aspect 1)

Aspect 1 is an antenna device for vehicle including a first antenna element disposed on a ground, and a second antenna element disposed on the ground, in which at least a portion of the first antenna element and at least a portion of the second antenna element are capacitively coupled.

According to Aspect 1, capacitive coupling between the first antenna element and the second antenna element contributes to a low VSWR and high radiation efficiency in a low frequency band. Accordingly, it is possible to enable an antenna to be used stably with high radiation efficiency over a broadband.

(Aspect 2)

Aspect 2 is the antenna device for vehicle according to Aspect 1, in which the first antenna element has a feeding portion, and the second antenna element has a short-circuit portion short-circuited to the ground.

According to Aspect 2, satisfactory characteristics can be obtained in a low frequency band compared to a case where the second antenna element is electrically opened to the ground.

(Aspect 3)

Aspect 3 is the antenna device for vehicle according to Aspect 1 or 2, in which the first antenna element has a first region positioned on one side of the second antenna element, and a second region positioned on the other side opposite to the one side of the second antenna element, at least a portion of the first region of the first antenna element is capacitively coupled to at least a portion of the second antenna element, and at least a portion of the second region of the first antenna element is capacitively coupled to at least a portion of the second antenna element.

According to Aspect 3, capacitive coupling between the first region of the first antenna element and the second antenna element, and capacitive coupling between the second region of the first antenna element and the second antenna element contribute to a low VSWR and high radiation efficiency in a low frequency band. Accordingly, it is possible to enable an antenna to be used stably with high radiation efficiency over a broadband.

(Aspect 4)

Aspect 4 is the antenna device for vehicle according to any one of Aspects 1 to 3, in which the first antenna element has a first end and a second end at a position away from the ground with respect to the first end, the second antenna element has a third end and a fourth end at a position away from the ground with respect to the third end, and at least a portion of the second end of the first antenna element and at least a portion of the fourth end of the second antenna element are capacitively coupled.

According to Aspect 4, capacitive coupling between the second end of the first antenna element and the fourth end of the second antenna element contributes to a low VSWR and high radiation efficiency in a low frequency band. Accordingly, it is possible to enable an antenna to be used stably with high radiation efficiency over a broadband.

(Aspect 5)

Aspect 5 is the antenna device for vehicle according to Aspect 4, in which a width of the first antenna element increases stepwise or gradually from the first end to the second end.

According to Aspect 5, the first antenna element can function as an antenna having a self-similar shape. That is, since the first antenna element functions as a self-similar shape or an equivalent tapered antenna, functions as a monopole antenna, or functions as a loop antenna or a split ring antenna depending on a frequency band of an operation frequency band, it is possible to enable an antenna to be used stably with high radiation efficiency over a broadband.

(Aspect 6)

Aspect 6 is the antenna device for vehicle according to Aspect 4 or 5, in which a width of the second antenna element increases stepwise or gradually from the third end to the fourth end.

According to Aspect 6, since the second antenna element functions as an antenna having a self-similar shape, it is possible to enable an antenna to be used stably with high radiation efficiency over a broadband.

(Aspect 7)

Aspect 7 is the antenna device for vehicle according to any one of Aspects 4 to 6, in which the second end of the first antenna element is inclined obliquely with respect to the ground.

According to Aspect 7, a superimposed area of the second end of the first antenna element and the fourth end of the second antenna element is adjusted by the inclination of the second end, such that it is possible to adjust a capacitive coupling between the second end of the first antenna element and the fourth end of the second antenna element.

(Aspect 8)

Aspect 8 is the antenna device for vehicle according to any one of Aspects 1 to 7, in which at least a portion of the first antenna element or the second antenna element is provided with a dielectric.

According to Aspect 8, it is possible to smooth the VSWR characteristics with the dielectric.

(Aspect 9)

Aspect 9 is the antenna device for vehicle according to any one of Claims Aspects 1 to 8, in which a difference between a length of the first antenna element and a length of the second antenna element is within ±25% of the length of the first antenna element or the length of the second antenna element.

According to Aspect 9, it is possible to enable an antenna to be used stably with high radiation efficiency over a broadband.

(Aspect 10)

Aspect 10 is the antenna device for vehicle according to any one of Aspects 1 to 9, in which a corner of the at least a portion of the first antenna element is rounded.

According to Aspect 10, it is possible to suppress the occurrence of a defect, such as damage to a worker in assembling the antenna device for vehicle due to the corner or damage to other members due to the corner, compared to a case where the corner of the first antenna element is sharp.

(Aspect 11)

Aspect 11 is the antenna device for vehicle according to any one of Aspects 1 to 10, further including a holder positioned between at least a portion of the first antenna element and at least a portion of the second antenna element, in which at least a portion of the first antenna element and the second antenna element is supported by the holder.

According to Aspect 11, it is possible to suppress an influence of vibration of an automobile on which the antenna device for vehicle is mounted, on mechanical characteristics of at least one of the first antenna element and the second antenna element, compared to a case where the holder is not provided. Fluctuation of a distance between at least a portion of the first antenna element and at least a portion of the second antenna element capacitively coupled or fluctuation of a superimposed area of at least a portion of the first antenna element and at least a portion of the second antenna element capacitively coupled, due to vibration of an automobile on which the antenna device for vehicle is mounted is suppressed, and it is possible to suppress fluctuation of capacitance between the first antenna element and the second antenna element, compared to a case where the holder is not provided.

This application claims priority based on Japanese Patent Application No. 2020-053910, filed Mar. 25, 2020, the entire disclosure of which is incorporated herein.

REFERENCE SIGNS LIST

10 antenna device for vehicle
20 ground
100 first antenna element
100A first antenna element
100B first antenna element
102 first end
102A first end
102B first end
102*a* feeding portion
104 second end
104A second end
104B second end
106 fifth end
106A fifth end
106B fifth end
110 first region
110A first region
112 first portion
112A first portion
114 second portion
114A second portion
116 first step portion
116A first step portion
120 second region
120A second region
122 fifth portion
124 sixth portion
126 second step portion
150 dielectric
150A first dielectric
150B second dielectric
160 substrate
200 second antenna element
200A second antenna element
200B second antenna element
202 Third end
202A third end
202B third end
202*a* short-circuit portion
204 fourth end
204A fourth end
204B fourth end
212 third portion
214 fourth portion
300A holder
300B holder
310A first block
310B first block
320A second block
320B second block
330A projection portion
342A first protrusion
344A second protrusion
352A third protrusion
362A support portion
362Aa first support
362Ab second support
410 first antenna portion
420 second antenna portion
510 antenna base
520 substrate
530 antenna case
X first direction
Y second direction
Z third direction

The invention claimed is:

1. An antenna device for a vehicle, the antenna device comprising:

a first antenna element disposed on a ground and located in a first vertical plane; and a second antenna element disposed on the ground and located in a second vertical plane, wherein the first and second vertical planes are separated from each other in a horizontal direction relative to a front and rear of the vehicle, and wherein at least a portion of the first antenna element and at least a portion of the second antenna element are capacitively coupled.

2. The antenna device, according to claim 1, wherein the first antenna element has a feeding portion, and the second antenna element has a short-circuit portion short-circuited to the ground.

3. The antenna device according to claim 1, wherein the first antenna element has a first region positioned on one side of the second antenna element, and a second region positioned on the other side opposite to the one side of the second antenna element, at least a portion of the first region of the first antenna element is capacitively coupled to at least a portion of the second antenna element, and at least a portion of the second region of the first antenna element is capacitively coupled to at least a portion of the second antenna element.

4. The antenna device according to claim 1, wherein the first antenna element has a first end and a second end at a position away from the ground with respect to the first end, the second antenna element has a third end and a fourth end at a position away from the ground with respect to the third end, and at least a portion of the second end of the first antenna element and at least a portion of the fourth end of the second antenna element are capacitively coupled.

5. The antenna device according to claim 4, wherein a width of the first antenna element increases stepwise or gradually from the first end to the second end.

6. The antenna device according to claim 4, wherein a width of the second antenna element increases stepwise or gradually from the third end to the fourth end.

7. The antenna device according to claim 4, wherein the second end of the first antenna element is inclined obliquely with respect to the ground.

8. The antenna device according to claim 1, wherein at least a portion of the first antenna element or the second antenna element is provided with a dielectric.

9. The antenna device according to claim 1, wherein a difference between a length of the first antenna element and a length of the second antenna element is within ±25% of the length of the first antenna element or the length of the second antenna element.

10. The antenna device according to claim 8, wherein the dielectric that is mounted on the ground has one end that is higher in a vertical direction than another end of the dielectric.

11. The antenna device according to claim 1, wherein an upper portion of the first antenna element is connected to an upper portion of the second antenna element by a dielectric that is not in contact with the ground.

12. The antenna device according to claim 1, wherein the first antenna element is formed on a first surface of a substrate extending in a vertical direction, and the second antenna element is formed on a second surface of the substrate opposite to the first surface of the substrate.

13. The antenna device according to claim 1, wherein the antenna device is configured to be mounted to a roof of the vehicle.

14. The antenna device according to claim 13, wherein the ground is the roof of the vehicle.

15. The antenna device according to claim 1, wherein at least a portion of the first antenna element or the second antenna element is connected to a dielectric that is mounted on the ground.

* * * * *